US012246511B2

(12) United States Patent
Koslowski et al.

(10) Patent No.: US 12,246,511 B2
(45) Date of Patent: Mar. 11, 2025

(54) BIAXIALLY ORIENTED THERMOPLASTIC POLYMER LAMINATE FILMS FOR LUGGAGE ARTICLES AND METHODS OF MAKING THE SAME

(71) Applicant: Samsonite IP Holdings S.a r.l., Luxembourg (LU)

(72) Inventors: Pauline M. Koslowski, Berchem (BE); Rik Hillaert, Oudenaarde (BE)

(73) Assignee: Samsonite IP Holdings S.a r.l., Luxembourg (LU)

( * ) Notice: Subject to any disclaimer, the term of this patent is extended or adjusted under 35 U.S.C. 154(b) by 0 days.

(21) Appl. No.: 18/748,216

(22) Filed: Jun. 20, 2024

(65) Prior Publication Data
US 2024/0336026 A1 Oct. 10, 2024

Related U.S. Application Data

(63) Continuation of application No. 16/493,442, filed as application No. PCT/EP2018/056586 on Mar. 15, 2018.

(30) Foreign Application Priority Data

Mar. 15, 2017 (EP) ..................... 17161218

(51) Int. Cl.
B32B 37/14 (2006.01)
A45C 5/02 (2006.01)
(Continued)

(52) U.S. Cl.
CPC .................. *B32B 1/00* (2013.01); *A45C 5/02* (2013.01); *A45C 5/03* (2013.01); *B32B 5/26* (2013.01);
(Continued)

(58) Field of Classification Search
CPC ..... B32B 37/144; B32B 37/206; B32B 38/12; B32B 2307/516; B32B 2307/518;
(Continued)

(56) References Cited

U.S. PATENT DOCUMENTS 3,169,899 A 2/1965 Walter
3,608,682 A 9/1971 Newton et al.
(Continued)

FOREIGN PATENT DOCUMENTS

AT 515022 T 7/2011
AU 7227091 A 8/1991
(Continued)

OTHER PUBLICATIONS

Extended European Search Report for European Patent Application No. 20170469.9, dated Dec. 23, 2020, 6 pages.
(Continued)

*Primary Examiner* — Robert B Davis
(74) *Attorney, Agent, or Firm* — Dorsey & Whitney LLP

(57) ABSTRACT

A laminate (110) of polypropylene films (100), a luggage shell (120) constructed of the laminate (110), a method (200) of making the laminate (110), and a method (280) of making the luggage shell (120) are provided. The films (100) include a core (102) and at least one outer layer (104). The laminate (110) includes a plurality of films (100). The laminate (110) may be formed by laminating a plurality of films 100 under predetermined pressure, temperature, and time conditions. The shell (120) may be formed by deep drawing a sheet of laminate (110) while applying heat and tension to the laminate (110).

18 Claims, 11 Drawing Sheets

(51) Int. Cl.
- *A45C 5/03* (2006.01)
- *B32B 1/00* (2006.01)
- *B32B 5/26* (2006.01)
- *B32B 27/08* (2006.01)
- *B32B 27/12* (2006.01)
- *B32B 27/32* (2006.01)
- *B32B 37/20* (2006.01)
- *B32B 38/12* (2006.01)
- *B29C 33/38* (2006.01)
- *B29L 31/00* (2006.01)

(52) U.S. Cl.
CPC ............. *B32B 27/08* (2013.01); *B32B 27/12* (2013.01); *B32B 27/32* (2013.01); *B32B 37/144* (2013.01); *B32B 37/206* (2013.01); *B32B 38/12* (2013.01); *A45C 2005/037* (2013.01); *B29C 2033/385* (2013.01); *B29C 2948/92152* (2019.02); *B29L 2031/7418* (2013.01); *B32B 2250/05* (2013.01); *B32B 2250/242* (2013.01); *B32B 2307/516* (2013.01); *B32B 2307/518* (2013.01); *B32B 2307/54* (2013.01); *B32B 2307/546* (2013.01); *B32B 2309/022* (2013.01); *B32B 2323/10* (2013.01); *B32B 2439/40* (2013.01); *Y10T 428/13* (2015.01); *Y10T 428/1352* (2015.01); *Y10T 428/1362* (2015.01); *Y10T 428/1372* (2015.01)

(58) Field of Classification Search
CPC .......... B32B 2307/54; B32B 2307/546; B32B 2309/022; B32B 2323/10; B32B 2439/40; B29L 2031/7418
See application file for complete search history.

(56) References Cited

U.S. PATENT DOCUMENTS

| | | |
|---|---|---|
| 4,061,817 A | 12/1977 | Maxel |
| 4,228,215 A | 10/1980 | Hein, III et al. |
| 4,384,016 A | 5/1983 | Ide et al. |
| 5,578,370 A | 11/1996 | Ferrar et al. |
| 5,843,057 A | 12/1998 | Mccormack |
| 5,891,552 A | 4/1999 | Lu et al. |
| 5,894,007 A | 4/1999 | Younessian et al. |
| 5,993,711 A | 11/1999 | Grunstra |
| 6,045,923 A | 4/2000 | Kok et al. |
| 6,458,727 B1 | 10/2002 | Jones et al. |
| 6,710,253 B2 | 3/2004 | Wildschut |
| 6,769,227 B2 | 8/2004 | Mumpower et al. |
| 6,863,976 B2 | 3/2005 | Morin et al. |
| 7,160,949 B2 | 1/2007 | Ota et al. |
| 7,192,636 B2 | 3/2007 | Taghavi |
| 7,202,328 B2 | 4/2007 | Ward et al. |
| 7,247,389 B2 | 7/2007 | Umeda |
| 7,294,384 B2 | 11/2007 | Eleazer et al. |
| 7,318,961 B2 | 1/2008 | Loos et al. |
| 7,410,683 B2 | 8/2008 | Curro et al. |
| 7,473,473 B2 | 1/2009 | Verrocchi |
| 7,501,363 B2 | 3/2009 | Dharmadhikary et al. |
| 7,611,763 B2 | 11/2009 | Atsma et al. |
| 7,648,607 B2 | 1/2010 | Morin |
| 7,718,243 B2 | 5/2010 | Curro et al. |
| 7,740,932 B2 | 6/2010 | Kismarton |
| 7,790,641 B2 | 9/2010 | Baker, Jr. et al. |
| 7,833,916 B2 | 11/2010 | Leeser et al. |
| 7,846,536 B2 | 12/2010 | Dubey |
| 7,879,747 B2 | 2/2011 | Conrad et al. |
| 7,887,660 B2 | 2/2011 | Jeruzal et al. |
| 8,021,592 B2 | 9/2011 | Ward et al. |
| 8,029,633 B2 | 10/2011 | Nair et al. |
| 8,052,913 B2 | 11/2011 | Ward et al. |
| 8,075,977 B2 | 12/2011 | Curro et al. |
| 8,114,507 B2 | 2/2012 | Nair et al. |
| 8,206,628 B2 | 6/2012 | Stone et al. |
| 8,263,210 B2 | 9/2012 | Rasmussen |
| 8,268,439 B2 | 9/2012 | Ward et al. |
| 8,298,661 B2 | 10/2012 | Samanta et al. |
| 8,309,478 B2 | 11/2012 | Nair et al. |
| 8,562,783 B2 | 10/2013 | Schoenbeck |
| 8,603,281 B2 | 12/2013 | Welch et al. |
| 8,680,361 B2 | 3/2014 | Zhang et al. |
| 8,808,829 B2 | 8/2014 | Preisler et al. |
| 8,808,830 B2 | 8/2014 | Preisler et al. |
| 8,808,831 B2 | 8/2014 | Preisler et al. |
| 8,808,833 B2 | 8/2014 | Preisler et al. |
| 8,871,333 B2 | 10/2014 | Ward et al. |
| 8,883,285 B2 | 11/2014 | Preisler et al. |
| 8,986,584 B2 | 3/2015 | Stone et al. |
| 9,016,324 B2 | 4/2015 | Niccolls et al. |
| 9,090,018 B2 | 7/2015 | Rasmussen |
| 9,114,042 B2 | 8/2015 | Frazer et al. |
| 9,221,403 B2 | 12/2015 | Yamamoto et al. |
| 9,271,879 B2 | 3/2016 | Stone et al. |
| 9,284,227 B2 | 3/2016 | Niccolls et al. |
| 9,403,341 B2 | 8/2016 | Ward et al. |
| 9,527,268 B2 | 12/2016 | Preisler et al. |
| 9,573,352 B2 | 2/2017 | Lee |
| 9,597,856 B2 | 3/2017 | Kim et al. |
| 9,615,670 B2 | 4/2017 | Takaoka |
| 9,643,383 B2 | 5/2017 | Jeon |
| 9,650,549 B2 | 5/2017 | Ackermann et al. |
| 9,707,790 B2 | 7/2017 | Fu, Jr. et al. |
| 9,708,513 B2 | 7/2017 | Ackermann et al. |
| 9,715,872 B2 | 7/2017 | Guzman et al. |
| 9,796,154 B2 | 10/2017 | Claasen et al. |
| 9,827,696 B2 | 11/2017 | Afshari |
| 9,873,239 B2 | 1/2018 | Ward et al. |
| 9,878,526 B2 | 1/2018 | Preisler et al. |
| 9,976,020 B2 | 5/2018 | Nummila-pakarinen et al. |
| 9,976,050 B2 | 5/2018 | Okazaki |
| 9,982,967 B2 | 5/2018 | Singletary et al. |
| 10,011,097 B2 | 7/2018 | Maruyama et al. |
| 10,059,079 B2 | 8/2018 | Kunal et al. |
| 10,059,091 B2 | 8/2018 | Roudonis |
| 10,081,159 B2 | 9/2018 | Bhatnagar et al. |
| 10,088,092 B2 | 10/2018 | Hwang |
| 10,212,829 B2 | 2/2019 | Lee |
| 10,232,594 B2 | 3/2019 | Mitchell et al. |
| 10,247,522 B2 | 4/2019 | Singletary et al. |
| 10,260,237 B2 | 4/2019 | Hubbard et al. |
| 10,270,074 B2 | 4/2019 | Natesh et al. |
| 10,272,640 B2 | 4/2019 | Bhatnagar et al. |
| 10,294,596 B2 | 5/2019 | Wang et al. |
| 10,357,935 B2 | 7/2019 | Lee et al. |
| 10,357,946 B2 | 7/2019 | Leatherman et al. |
| 10,384,400 B2 | 8/2019 | Kang et al. |
| 10,391,738 B2 | 8/2019 | Liu et al. |
| 10,399,299 B2 | 9/2019 | Gruenewald et al. |
| 10,457,013 B2 | 10/2019 | Kawka et al. |
| 10,493,702 B2 | 12/2019 | Yun et al. |
| 10,493,719 B2 | 12/2019 | Nozaki et al. |
| 10,532,537 B2 | 1/2020 | Sasaki et al. |
| 10,532,545 B2 | 1/2020 | Fushimi et al. |
| 10,543,637 B2 | 1/2020 | Stone et al. |
| 10,543,665 B2 | 1/2020 | Alef et al. |
| 10,549,512 B2 | 2/2020 | Davis et al. |
| 10,696,027 B2 | 6/2020 | Van Der Sanden et al. |
| 10,850,479 B2 | 12/2020 | Ward et al. |
| 10,882,590 B2 | 1/2021 | Bladd-symms et al. |
| 11,135,756 B1 | 10/2021 | Eleazer |
| 2002/0016121 A1 | 2/2002 | Bjekovic et al. |
| 2002/0066895 A1 | 6/2002 | Wildschut |
| 2004/0118504 A1 | 6/2004 | Herrmann et al. |
| 2004/0242103 A1 | 12/2004 | Loos et al. |
| 2005/0031233 A1 | 2/2005 | Varanese et al. |
| 2006/0151104 A1 | 7/2006 | Jacobs et al. |
| 2007/0166507 A1 | 7/2007 | Atsma et al. |
| 2008/0063846 A1 | 3/2008 | Loos et al. |
| 2008/0254281 A1* | 10/2008 | Chen ............... B32B 27/32 428/335 |
| 2009/0068453 A1 | 3/2009 | Chung |

(56) References Cited

U.S. PATENT DOCUMENTS

| | | |
|---|---|---|
| 2015/0376353 A1 | 12/2015 | Takebe et al. |
| 2016/0046064 A1 | 2/2016 | Sartor et al. |
| 2016/0113366 A1 | 4/2016 | Sijmons et al. |
| 2018/0126708 A1 | 5/2018 | Ward et al. |
| 2018/0200986 A1 | 7/2018 | Wagner et al. |
| 2019/0054985 A1 | 2/2019 | Bladd-symms et al. |
| 2019/0059535 A1 | 2/2019 | Vannier et al. |
| 2020/0139665 A1 | 5/2020 | Berrang |
| 2021/0008850 A1 | 1/2021 | Ward et al. |
| 2021/0178722 A1 | 6/2021 | Koslowski et al. |
| 2021/0246335 A1 | 8/2021 | Panhans |
| 2023/0382078 A1 | 11/2023 | Teather et al. |

FOREIGN PATENT DOCUMENTS

| | | |
|---|---|---|
| AU | 2002318061 B2 | 3/2008 |
| AU | 2003267859 B2 | 6/2009 |
| AU | 2003238715 B2 | 6/2010 |
| AU | 2004240803 B2 | 9/2010 |
| AU | 2014351466 A1 | 6/2016 |
| BE | 1025677 A1 | 5/2019 |
| BR | PI0214500-6 B1 | 11/2004 |
| BR | PI0214502-2 B1 | 11/2004 |
| BR | 0314665 A | 8/2005 |
| BR | 0318320 A | 7/2006 |
| BR | PI0607249 A2 | 1/2010 |
| BR | 0211248 B1 | 9/2012 |
| CA | 2100975 A1 | 8/1991 |
| CA | 2358635 A1 | 4/2003 |
| CA | 2500258 A1 | 4/2004 |
| CA | 2525826 A1 | 12/2004 |
| CA | 2466832 C | 11/2010 |
| CA | 2465289 C | 1/2011 |
| CA | 2454030 C | 11/2011 |
| CA | 2526504 C | 4/2012 |
| CN | 1244251 A | 2/2000 |
| CN | 1703317 A | 11/2005 |
| CN | 101027179 A | 8/2007 |
| CN | 1826213 B | 2/2011 |
| CN | 101326047 B | 4/2012 |
| CN | 104139591 A | 11/2014 |
| CN | 104169077 A | 11/2014 |
| CN | 204869935 U | 12/2015 |
| CN | 204936352 U | 1/2016 |
| CN | 105615053 A | 6/2016 |
| CN | 106183154 A | 12/2016 |
| CN | 107428117 A | 12/2017 |
| CN | 107489021 A | 12/2017 |
| CN | 106393899 B | 3/2019 |
| CN | 209616539 U | 11/2019 |
| CN | 107972343 B | 7/2020 |
| DE | 9312867 U1 | 1/1994 |
| DE | 69022615 | 11/1995 |
| DE | 69609801 | 9/2000 |
| DE | 69329604 | 12/2000 |
| DE | 69611264 | 1/2001 |
| DE | 69808528 | 11/2002 |
| DE | 29624441 U1 | 2/2004 |
| DE | 20321189 U1 | 5/2006 |
| DK | 0391661 T3 | 2/1996 |
| DK | 0570215 T3 | 2/2001 |
| DK | 0859072 T3 | 2/2003 |
| DK | 2976208 T3 | 7/2017 |
| EP | 0337662 A2 | 10/1989 |
| EP | 0391661 A2 | 10/1990 |
| EP | 0354285 B1 | 11/1992 |
| EP | 0570215 A2 | 11/1993 |
| EP | 0592054 A1 | 4/1994 |
| EP | 0742305 A1 | 11/1996 |
| EP | 0853145 A1 | 7/1998 |
| EP | 0997562 A2 | 5/2000 |
| EP | 0776762 B1 | 8/2000 |
| EP | 1216612 A2 | 6/2002 |
| EP | 0859072 B1 | 10/2002 |
| EP | 1273416 A1 | 1/2003 |
| EP | 1277573 A1 | 1/2003 |
| EP | 1400348 A2 | 3/2004 |
| EP | 1403038 A1 | 3/2004 |
| EP | 1479498 A1 | 11/2004 |
| EP | 1118701 B1 | 3/2005 |
| EP | 1621071 A1 | 2/2006 |
| EP | 1650021 A1 | 4/2006 |
| EP | 1657334 A1 | 5/2006 |
| EP | 1693193 A1 | 8/2006 |
| EP | 1710076 A1 | 10/2006 |
| EP | 1712352 A1 | 10/2006 |
| EP | 1712669 A1 | 10/2006 |
| EP | 1763430 B1 | 3/2007 |
| EP | 1400348 B1 | 6/2007 |
| EP | 1409244 B1 | 10/2007 |
| EP | 1558100 B1 | 10/2008 |
| EP | 1216612 B1 | 11/2008 |
| EP | 1913188 B1 | 1/2009 |
| EP | 1890868 B1 | 7/2009 |
| EP | 2141015 A2 | 1/2010 |
| EP | 2159043 A2 | 3/2010 |
| EP | 1453647 B1 | 3/2011 |
| EP | 1458538 B1 | 9/2011 |
| EP | 1461203 B1 | 4/2012 |
| EP | 1713638 B1 | 5/2012 |
| EP | 1919701 B1 | 8/2012 |
| EP | 1885546 B1 | 3/2013 |
| EP | 2437925 B1 | 7/2013 |
| EP | 2636522 A1 | 9/2013 |
| EP | 2774753 A1 | 9/2014 |
| EP | 2853627 A1 | 4/2015 |
| EP | 2976208 A1 | 1/2016 |
| EP | 2998111 A1 | 3/2016 |
| EP | 2720862 B1 | 8/2016 |
| EP | 2299956 B1 | 12/2016 |
| EP | 1631431 B1 | 4/2017 |
| EP | 3175980 A1 | 6/2017 |
| EP | 3176216 A1 | 6/2017 |
| EP | 3184275 A1 | 6/2017 |
| EP | 3192910 A1 | 7/2017 |
| EP | 3211128 A2 | 8/2017 |
| EP | 3077195 B1 | 8/2018 |
| EP | 3083247 B1 | 10/2018 |
| EP | 3265307 B1 | 1/2019 |
| EP | 2914395 B1 | 2/2019 |
| EP | 3283290 B1 | 2/2019 |
| EP | 1572450 B1 | 7/2019 |
| EP | 3148793 B1 | 7/2019 |
| EP | 3553213 A2 | 10/2019 |
| EP | 3613880 A1 | 2/2020 |
| EP | 3455063 B1 | 4/2020 |
| EP | 3736362 A1 | 11/2020 |
| EP | 3842225 A1 | 6/2021 |
| EP | 3261839 B1 | 8/2021 |
| ES | 2077025 T3 | 11/1995 |
| ES | 2151499 T3 | 1/2001 |
| ES | 2270820 T3 | 4/2007 |
| ES | 2628830 T3 | 8/2017 |
| FR | 2779988 B1 | 7/2000 |
| GB | 1386953 A * | 3/1975 ............... A45C 5/02 |
| GB | 2204043 A | 11/1988 |
| GB | 2206079 A | 12/1988 |
| GB | 2266322 A | 10/1993 |
| GB | 2279232 A | 1/1995 |
| GB | 2281051 A | 2/1995 |
| GB | 2388815 B | 1/2006 |
| GB | 2420351 A | 5/2006 |
| GB | 2437238 A | 10/2007 |
| GB | 2495622 A | 4/2013 |
| GB | 2494544 B | 8/2013 |
| GB | 2494543 B | 9/2013 |
| GB | 2496244 B | 11/2013 |
| GB | 2518055 B | 8/2015 |
| GB | 2543434 A | 4/2017 |
| GB | 2492644 B | 12/2018 |
| GB | 2569419 B | 9/2020 |
| GB | 2571547 B | 9/2020 |
| GB | 2569832 B | 10/2020 |
| GB | 2579013 A | 10/2020 |

(56) References Cited

FOREIGN PATENT DOCUMENTS

| | | | |
|---|---|---|---|
| GB | 2558156 | B | 9/2021 |
| IN | 256542 | B | 7/2013 |
| IN | 257341 | B | 9/2013 |
| JP | 1157564 | A | 6/1999 |
| JP | 2001010629 | A | 1/2001 |
| JP | 2003236961 | A | 8/2003 |
| JP | 2004148749 | A | 5/2004 |
| JP | 2004299770 | A | 10/2004 |
| JP | 3667290 | B2 | 4/2005 |
| JP | 2005206223 | A | 8/2005 |
| JP | 3718635 | B2 | 9/2005 |
| JP | 2006111305 | A | 4/2006 |
| JP | 2008502503 | A | 1/2008 |
| JP | 4125083 | B2 | 5/2008 |
| JP | 2008517802 | A | 5/2008 |
| JP | 4504822 | B2 | 4/2010 |
| JP | 4666839 | B2 | 1/2011 |
| JP | 4723363 | B2 | 4/2011 |
| JP | 4756824 | B2 | 6/2011 |
| JP | 4756827 | B2 | 6/2011 |
| JP | 4943894 | B2 | 3/2012 |
| JP | 4949608 | B2 | 3/2012 |
| JP | 4976530 | B2 | 4/2012 |
| JP | 2012096458 | A | 5/2012 |
| JP | 5014070 | B2 | 6/2012 |
| JP | 5138222 | B2 | 11/2012 |
| JP | 2013006631 | A | 1/2013 |
| JP | 5429852 | B2 | 12/2013 |
| JP | 5519699 | B2 | 4/2014 |
| JP | 5863803 | B2 | 1/2016 |
| JP | 2016060202 | A | 4/2016 |
| JP | 2016083374 | A | 5/2016 |
| JP | 6000497 | B1 | 9/2016 |
| JP | 6189285 | B2 | 8/2017 |
| JP | 6192021 | B2 | 8/2017 |
| JP | 6321910 | B2 | 4/2018 |
| JP | 6441668 | B2 | 11/2018 |
| JP | 6463736 | B2 | 1/2019 |
| JP | 3221641 | U | 5/2019 |
| JP | 6622025 | B2 | 11/2019 |
| KR | 101800994 | B1 | 11/2017 |
| NZ | 236960 | A | 4/1994 |
| NZ | 530853 | A | 4/2006 |
| NZ | 543861 | A | 9/2008 |
| NZ | 570622 | A | 5/2010 |
| RU | 2377126 | C2 | 12/2009 |
| TW | 200718558 | A | 5/2007 |
| TW | 201522506 | A | 6/2015 |
| TW | I627060 | B | 6/2018 |
| WO | 9111324 | A1 | 8/1991 |
| WO | 9929838 | A1 | 6/1999 |
| WO | 0177436 | A1 | 10/2001 |
| WO | 02090082 | A1 | 11/2002 |
| WO | 03008190 | A1 | 1/2003 |
| WO | 03045659 | A1 | 6/2003 |
| WO | 03045660 | A1 | 6/2003 |
| WO | 2004028803 | A1 | 4/2004 |
| WO | 2004103673 | A2 | 12/2004 |
| WO | 2004106601 | A1 | 12/2004 |
| WO | 2005123369 | A1 | 12/2005 |
| WO | 2006046862 | A1 | 5/2006 |
| WO | 2006047374 | A1 | 5/2006 |
| WO | 2006047376 | A1 | 5/2006 |
| WO | 2012137140 | A1 | 10/2012 |
| WO | 2014147130 | A1 | 9/2014 |
| WO | 2016113366 | A1 | 7/2016 |
| WO | 2017068369 | A2 | 4/2017 |
| WO | 2018167233 | A1 | 9/2018 |
| WO | 2019116000 | A1 | 6/2019 |
| WO | 2019166807 | A1 | 9/2019 |

OTHER PUBLICATIONS

Cabrera, N. O., "Recyclable all-polypropylene composites: concept, properties and manufacturing", Cabrera, "Recyclable all-polypropylene composites: concept, properties and manufacturing" Technische Universiteit Eindhoven, (2004), 1-188, 1-188.

Di Pede, Sandro et al., "Deep Drawing Self-Reinforced Thermoplastic Sheet", Di Pede. et al., "Deep Drawing Self-Reinforced Thermoplastic Sheet" Polymer Engineering and Science, (1990), 30(79):1185-1199, 1185-1199.

PCT International Search Report and Written Opinion, App. No. PCT/EP2018/056586, Jun. 11, 2018, 10 pages.

Pure®—Technical Data Sheet, "Pure®—Technical Data Sheet, (2016) Version 01", Pure®—Technical Data Sheet, (2016) Version 01.

C. Maier and T. Calafut, Polypropylene—The Definitive User's Guide, Plastics Design Library, 1998, 7 pages.

Extended European Search Report for European Patent Application No. 17161218.7, dated Sep. 19, 2017, 8 pages.

Impact Resistance Measurement Protocol, date unknown, 1 page.

International Search Report and Written Opinion for International Patent Application No. PCT/EP2018/056586, dated Jun. 11, 2018, 11 pages.

Notice of Opposition for European Patent Application No. 18709651.6 dated Jan. 27, 2021, 20 pages.

Tensile Test Measurement Protocol, date unknown, 1 page.

Tetrafan KXE-S1, Heat sealable coextruded BOPP film, technical data sheet, Feb. 2020.

Extended European Search Report for European Patent Application No. 21157762.2, dated Jun. 1, 2021, 11 pages., Jun. 1, 2021.

Tan-Gillies, Strong as a rock, lightweight as skin: Samsonite unveils new Proxis luggage range, https://www.moodiedavittreport.com/strongl-as-rock-lightweight-as-skin-samsonite-unveils-new-proxis-luggage-range/, dated Jul. 10, 2020, 4 pages;, Jul. 10, 2020.

European Search Report for European Patent Application No. 23184840.9 dated Oct. 18, 2023, 14 pages.

\* cited by examiner

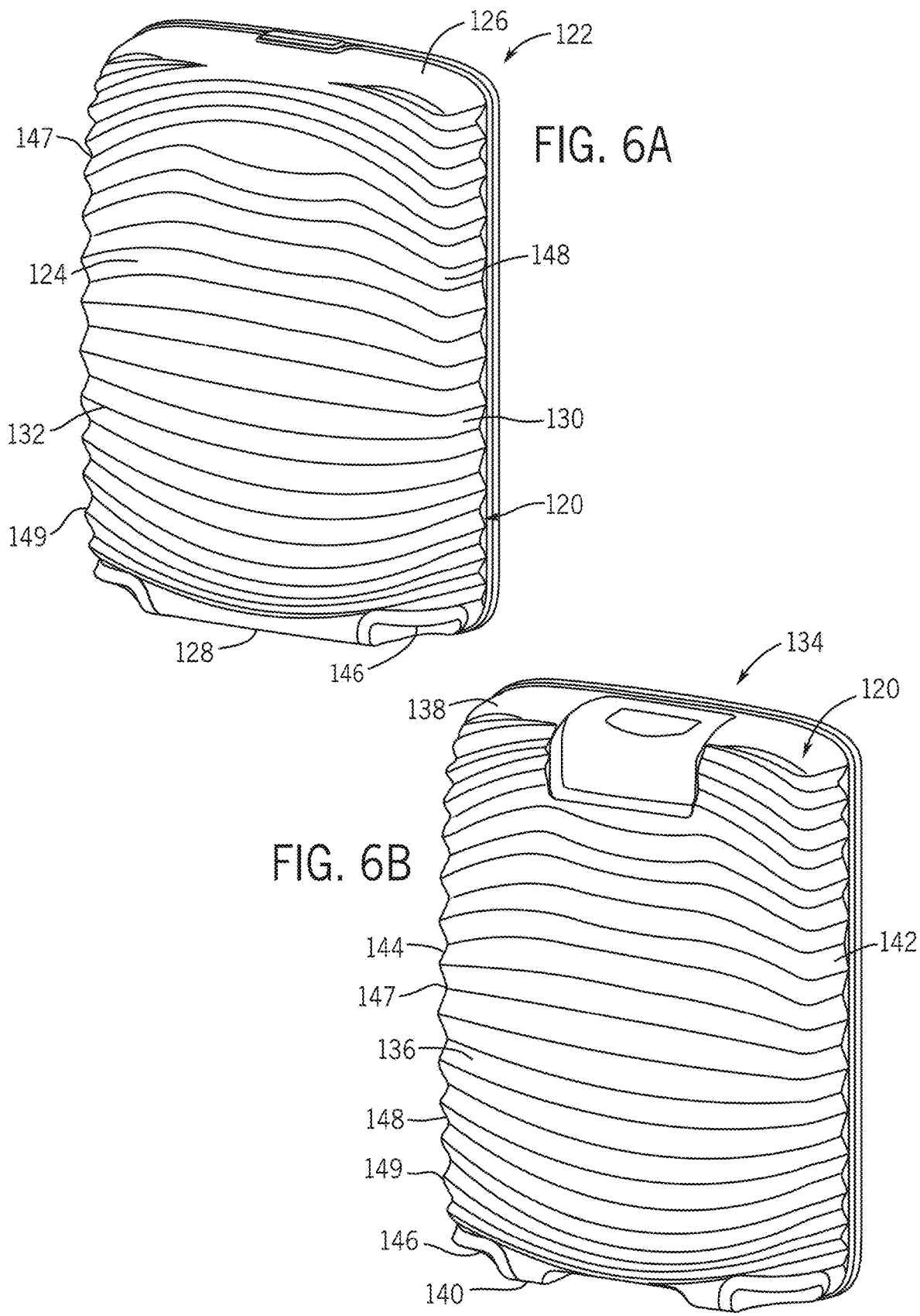

BIAXIALLY ORIENTED THERMOPLASTIC POLYMER LAMINATE FILMS FOR LUGGAGE ARTICLES AND METHODS OF MAKING THE SAME

CROSS-REFERENCE TO RELATED APPLICATIONS

This application is continuation of U.S. application Ser. No. 16/493,442 filed on Sep. 12, 2019 and entitled "Biaxially Oriented Thermoplastic Polymer Laminate Films For Luggage Articles and Methods of Making the Same" which is the national stage patent application of International Patent Application No. PCT/EP2018/056586 filed on Mar. 15, 2018 and entitled "Biaxially Oriented Thermoplastic Polymer Laminate Films For Luggage Articles and Method of Making the Same" which claims priority to European Patent Application No. 17161218.7 filed on Mar. 15, 2017 and entitled "Biaxially Oriented Thermoplastic Polymer Laminate Films For Luggage Articles and Method of Making the Same", the entire contents of which are hereby incorporated by reference herein in their entireties.

TECHNOLOGICAL FIELD

The present disclosure generally relates to luggage articles and, in particular, to the use of laminated biaxially oriented thermoplastic polymer films in the construction of the shell structure of a luggage case.

BACKGROUND

Hard side luggage cases provide durability and support by using formable, relatively hard materials to create the exterior of the case. One drawback of these materials is that they are difficult to manufacture and mold, demonstrating low tolerance of subtle variations in the manufacturing and molding processes. The unforgiving nature of the materials is particularly noticeable when producing deep drawn articles. A luggage shell or case produced from the materials may need to be relatively thick and/or relatively heavy to achieve the desired strength. The materials as well as the manufacturing and molding processes may also be expensive and the processes may be time-consuming.

Documents that may be related to the present disclosure in that they include various approaches to materials for luggage articles include EP1763430, GB1386953, U.S. Pat. No. 4,061,817, IN256542 and IN257341. These proposals, however, may be improved.

It is therefore desirable to provide an improved material for luggage articles, such as luggage shells, in particular a lightweight durable material, as well as to provide methods of making the material and the luggage article that are relatively easy, fast, forgiving, and inexpensive.

SUMMARY

According to the present invention there is therefore provided a material for making a luggage shell, a luggage shell constructed of the material, a method of making the material, a method of making the luggage shell and a luggage case including at least one shell constructed of the material, as described below and/or as defined in the accompanying claims.

The present disclosure in particular provides an improved plastic laminate material that is lightweight and impact resistant. The material is versatile and amenable to being deep drawn into articles such as luggage shells. A luggage shell constructed of the laminate is lightweight, thin, durable, resistant to deformation, and has exceptional impact resistance during handling.

A method of making the plastic laminate is provided that requires relatively little heat and pressure and is relatively fast and inexpensive. A method of making deep drawn articles, such as luggage shells, is provided. The method is relatively easy, fast, and inexpensive.

In one example, a luggage shell is formed of a laminate of a plurality of coextruded films. The films include a core of a biaxially oriented thermoplastic polymer and at least one outer layer of a thermoplastic polymer. The outer layer has a thickness of 0.5% to 25% of the thickness of the film.

In some examples, the film has a thickness of about 10 µm±5%-about 100 µm±5%.

In some examples, the core has a thickness of about 10 µm±5%-about 100 µm±5%.

In some examples, the outer layer has a thickness of about 0.6 µm±5% to about 2.5 µm±5%.

In one example, the outer layer is about 2% to about 7% of the thickness of the film. The outer layer may be less than about 5% of the thickness of the film or may be about 2.5% of the thickness of the film.

In another example, at least two adjacent films are oriented in the same direction.

In a further example, all films are oriented in the same direction.

In one example, the biaxially oriented thermoplastic polymer of the core is biaxially oriented polypropylene.

In one example, the outer layer comprises a copolymer of polypropylene and polyethylene.

In another example, the outer layer comprises a terpolymer of polypropylene, polyethylene, and polybutene.

In some examples, the melting point of the core is higher than a melting point of the outer layer. The melting point may be at least about 10° C. higher than melting point of the outer layer.

In some examples, the film is stretched and is stretched to a greater extent in one of a transverse direction and a longitudinal direction than in the other of the transverse direction and the longitudinal direction.

In some examples, the film has a tensile strength of about 60 to about 190 MPa in the longitudinal direction.

In some examples, the film has a tensile strength of about 150 to about 300 MPa in the transverse direction.

In some examples, the film has a stiffness of about 3.5-5 GPa in the transverse direction.

In some examples, the film has a stiffness of about 1.5-3 GPa in the longitudinal direction.

In some examples, the laminate includes 10 to 50 films. The number of films may be 22 or 23 films.

In one example, the thickness of the laminate is about 0.25 mm to about 2.5 mm. The thickness of the laminate may be about 0.5 mm to less or equal to about 1 mm.

In some examples, the laminate may include at least one film constructed of a thermoplastic polymer different than the thermoplastic polymer of the core.

In some examples, the laminate includes a top layer. The top layer may include biaxially oriented polyester.

In some examples, the luggage shell includes a fabric lining layer. The fabric lining layer may include a mesh textile sheet.

In one example, a method of making a luggage shell includes providing films, laminating a plurality of films together to form a laminate, and molding the laminate to form a luggage shell. The films have a core of a thermoplastic polymer and an outer layer on each of the top and bottom side of the core. The films are laminated at a temperature of 130° C. or less and a pressure of 10 bar or less, or in some examples less than 10 bar.

In one example, the core and the outer layer are coextruded to form the film.

In some examples, the film has a thickness of 10 µm±5%-100 µm±5%.

In some examples, the core has a thickness of 10 µm±5%-100 µm±5%.

In some examples, the outer layer has a thickness of 0.6 µm±5% to 2.5 µm±5%.

In some examples, the outer layer has a thickness of 0.5% to 25% of the thickness of the film. The thickness of the outer layer may be 2% to 7% of the thickness of the film.

In another example, at least two adjacent films are oriented in the same direction.

In a further example, all films are oriented in the same direction.

In one example, the biaxially oriented thermoplastic polymer of the core is biaxially oriented polypropylene.

In one example, the outer layer comprises a copolymer of polypropylene and polyethylene.

In another example, the outer layer comprises a terpolymer of polypropylene, polyethylene, and polybutene.

In some examples, the melting point of the core is higher than a melting point of the outer layer. The melting point may be at least 10° C. higher than melting point of the outer layer.

In some examples, the film is stretched and is stretched to a greater extent in one of a transverse direction and a longitudinal direction than in the other of the transverse direction and the longitudinal direction.

In some examples, the film has a tensile strength of 60 to 190 MPa in the longitudinal direction.

In some examples, the film has a tensile strength of 150 to 300 MPa in the transverse direction.

In some examples, the film has a stiffness of 3.5-5 GPa in the transverse direction.

In some examples, the film has a stiffness of 1.5-3 GPa in the longitudinal direction.

In some examples, the laminate includes 10 to 50 films. The number of films may be 22 or 23 films.

In one example, the thickness of the laminate is 0.25 mm to 2.5 mm. The thickness of the laminate may be 0.5 mm to less than 1 mm.

In some examples, the laminate may include at least one film constructed of a thermoplastic polymer different than the thermoplastic polymer of the core.

In another example, the films are laminated at a temperature of 110° C. to 130° C.

In a further example, the films are laminated at a pressure of 5 kN/m to 35 kN/m.

In some examples, the films are laminated at a pressure of 10 kN/m to 30 kN/m.

In some examples, the films are laminated in a continuous process.

In one example, laminating the films is performed in an isochoric press. In another example, laminating the films is performed in an isobaric press.

In another example, the laminate is cooled at atmospheric pressure.

In some examples, molding the luggage shell is performed at a temperature of 140° C. to 180° C.

In one example, a method of making a luggage shell includes providing films, laminating a plurality of films together to form a laminate, and molding the laminate to form a luggage shell. The films have a core of biaxially oriented polypropylene and an outer layer on each of the top and bottom side of the core. The films are laminated at a temperature of 130° C. or less and a pressure of less than 10 bar.

In some examples, the laminating temperature is 110° C. to 130° C.

In some examples, the pressure is 1 bar to 9 bar. The pressure may be 1 bar to 5 bar. In other examples, the pressure is less than 10 bar, or equal to or less than 10 bar.

In one example, the laminating is a continuous process.

In one example, the laminating is performed in an isochoric press. In another example, laminating the films is performed in an isobaric press.

In another example, at least two adjacent films are oriented in the same direction.

In a further example, all films are oriented in the same direction.

In some examples, the molding is performed at a temperature of about 140° C. to about 165° C.

In one example, a luggage shell is provided that is made by a method that includes providing films, laminating a plurality of films together to form a laminate, and molding the laminate to form the luggage shell. The films have a core of a thermoplastic polymer and an outer layer on each of the top and bottom side of the core, and the films are laminated together. When the films are polypropylene films, the films are laminated at a temperature of about 130° C. or less and a pressure of less than about 40 kN/m, or, in an alternative example, less than about 10 bar. In another example the pressure is about 40 kN/m or less. In a further example the pressure is about 10 bar or less.

In one example, a luggage case including at least one aforementioned luggage shell is provided. The luggage shell is made by a method that includes providing films, laminating a plurality of films together to form a laminate, and molding the laminate to form the luggage shell. The films have a core of a thermoplastic polymer and may include an outer layer on each of, or just one of, the top and bottom side of the core, and the films are laminated together. When the films are polypropylene films, the films are laminated at a temperature of about 130° C. or less and a pressure of less than about 40 kN/m, or, in an alternative example, less than about 10 bar. In another example the pressure is about 40 kN/m or less. In a further example the pressure is about 10 bar or less. In a further example, the luggage case includes a lid shell and a base shell, either or both of which are produced by the aforementioned method.

Additional embodiments and features are set forth in part in the description that follows, and will become apparent to those skilled in the art upon examination of the specification or may be learned by the practice of the disclosed subject matter. A further understanding of the nature and advantages of the present disclosure may be realized by reference to the remaining portions of the specification and the drawings, which forms a part of this disclosure. One of skill in the art will understand that each of the various aspects and features of the disclosure may advantageously be used separately in some instances, or in combination with other aspects and features of the disclosure in other instances.

BRIEF DESCRIPTION OF THE DRAWINGS

The description will be more fully understood with reference to the following figures in which components are not drawn to scale, which are presented as various embodiments of the disclosure and should not be construed as a complete recitation of the scope of the disclosure, characterized in that:

FIG. 6A is a front right isometric view of a luggage shell formed by the process of FIG. 3A or 3C.

FIG. 6B is a rear left isometric view of the luggage shell of FIG. 6A.

DETAILED DESCRIPTION

The present disclosure provides an improved material for a luggage shell and an improved luggage shell constructed of the material. In particular, the present disclosure provides a material that is lightweight, impact resistant, versatile, and amenable to being deep drawn. In general, the material is constructed of a plurality of plastic films laminated together. The luggage shell constructed from the material is lightweight, thin, durable, and resistant to deformation. The amenability of the material to a deep drawing process helps produce a luggage shell substantially free of wrinkles, including in the corner regions, and separately or in combination, helps produce a high-quality surface finish. As used herein, the term "constructed of" may mean "includes" or "including."

The present disclosure may also provide a method of making the improved material that requires relatively little heat and pressure. The method may also be relatively fast and/or inexpensive. In particular, the plurality of plastic films is laminated under moderate heat and low-pressure conditions.

A method of making a luggage shell from the improved material that is relatively easy, fast, and inexpensive is also provided. The material may be heated, tensioned, and deep drawn to produce a luggage shell.

Polymer Films

Figure 1:
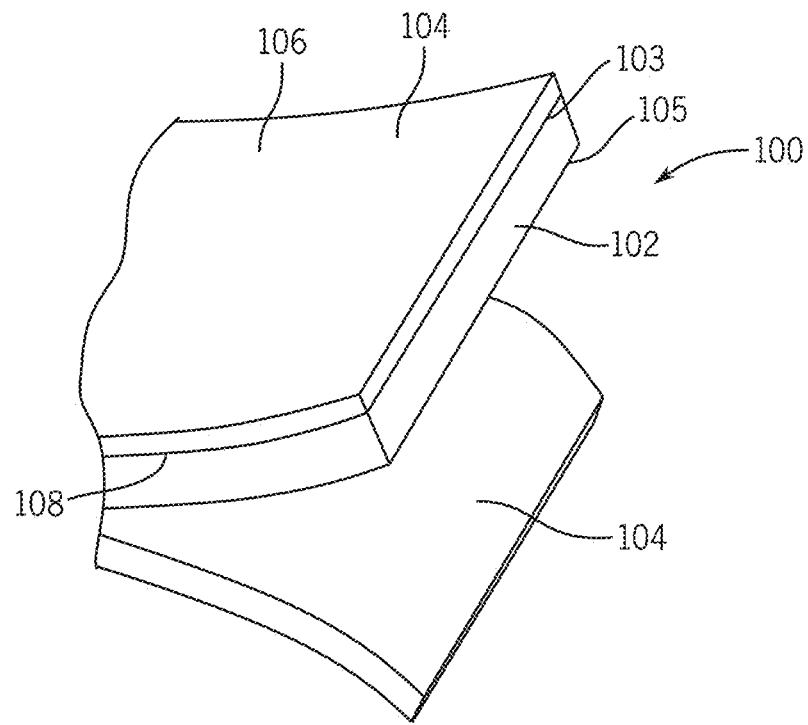
FIG. 1 is a fragmentary illustration of a biaxially orientated thermoplastic polymer film according to one example.

Referring to FIG. 1, a polymer film 100 includes a core 102 and at least one outer layer 104. As used herein, a "film" is a structure that includes a non-woven, planar, continuous sheet element. The outer layer 104 may be positioned on a top side 103 of the core 102, a bottom side 105, or both 103, 105. The core 102 is constructed of a thermoplastic polymer. The thermoplastic polymer may be biaxially oriented. As used herein, a "biaxially oriented" film is a film that has been stretched in two different directions, including as a non-limiting example being stretched in a transverse direction and a longitudinal direction, as described below in more detail. Examples of biaxially oriented thermoplastic polymers include biaxially oriented polypropylene homopolymer (BOPP), polyamide (BOPA), polyester (BOPET), polyvinylalcohol (BOPVA), polylactid acid (BOPLA), and polyethylene (BOPE). In one embodiment, the core 102 is constructed of BOPP.

The outer layer 104 is constructed of an oriented or non-oriented heat-sealable material. In one example, the outer layer 104 is constructed of a copolymer of polypropylene (PP) and polyethylene (PE). Polyethylene may constitute up to about 5% of the copolymer. In another example, the outer layer 104 is constructed of a terpolymer of polypropylene, polyethylene, and polybutene (PB). Polyethylene and polybutene together may constitute up to about 5% of the terpolymer.

The core 102 and outer layer 104 may be constructed of compatible polymers such that the core 102 and outer layer 104 may be coextruded. In some examples, the core 102 and outer layer 104 are constructed of polymers in the same polymer family. In one example, the core 102 is constructed of an oriented polypropylene homopolymer (OPP) and the outer layer 104 is constructed of a copolymer of polypropylene and polyethylene. In another example, the core 102 is constructed of an oriented polypropylene homopolymer and the outer layer 104 is constructed of a terpolymer of polypropylene, polyethylene, and polybutene.

The core 102 may have a thickness of about 10 µm±5% to about 100 µm±5%, such as about 30 µm±5% to about 50 µm±5%, or about 13 µm±5% to about 40 µm±5%, or about 40 µm±5%. The core 102 may have a melting point of about 150° C. to about 190° C. In one example, the core 102 has a melting point of about 170° C.

The outer layer 104 may have a thickness of about 0.6 µm±5% to about 2.5 µm±5%. In one example, an outer layer 104 has a thickness of about 1 µm±5%. The outer layer 104 may have a melting point of about 110° C. to about 135° C. In one example, the melting point is about 130° C.

The outer layer 104 has a lower melting point than the core 102. The difference between the melting point of the core 102 and the melting point of the outer layer 104 may be from about 10° C. to about 60° C., or from about 10° C. to about 50° C., or from about 10° C. to about 40° C., or from about 10° C. to about 30° C., or from about 10° C. to about 20° C. In the construction and design of a film 100, a greater difference (e.g., 60° C. instead of 5° C.) in melting point between the core 102 and the outer layer 104 may help produce a laminate 110, described below, with improved mechanical and/or physical properties. Without being limited to any mechanism or mode of action, a greater difference in melting point may permit laminating at a temperature that melts the outer layer 104 but does not melt the core 102. When the processing temperature approaches the melting point of the core 102, the core 102 may start to soften and the molecules of the core 102 may lose their orientation, which in turn may degrade the physical and mechanical properties of the resulting laminate 110 as compared to a laminate 110 in which the core 102 has not been melted or softened.

In the construction and design of a film 100, a difference in melting point between the core 102 and the outer layer 104 of at least about 10° C. may make the process of laminating a plurality of films 100 together easier. The layers of a film 100 may slide over each other, or adjacent films 100 may slide over each other when forming the laminate 110, when the processing temperature is high enough to melt or partially melt the outer layer 104 but not melt the core 102. While the mechanical properties of the laminate 110 are best maintained by not melting the core 102 during production of the laminate sheet, in an alternative example if the core 102 is softened or partially melted during production of the laminate 110 the mechanical properties may be reduced but may still be adequate for further use. The difference in melting point may also make the process of molding a laminate 110 easier because the laminate 110 is rendered malleable by the melting or partial melting of the outer layer 104 and the melting, partial melting, or softening of the core 102.

In one example, the outer layer 104 defines an outer surface 106 and an inner surface 108 adjacent to and engaging with the film 100. The outer surface 106 may be Corona treated, which may help provide sufficient wetting and adhesion to the film 100 for subsequent printing, laminating, or coating of the film 100. In one example, the outer layer 104 may be Corona treated on the outer surface 106.

A core 102 and at least one outer layer 104 may be coextruded to form a film 100. In contrast to woven fabrics, in which threads or tapes are woven in two directions (warp and weft) to form a plastic fabric, a coextruded film 100 is produced by simultaneous extrusion of multiple layers. The film 100 may have a thickness of about 10 μm±5% to about 100 μm±5%. In one example, the film 100 has a thickness of about 30 μm±5% to about 50 μm±5%. In another example, the film 100 has a thickness of about 40 μm±5%. The film 100 may have a square weight of about 13 g/m$^2$±5% to about 37 g/m$^2$±5%. The film 100 may be transparent, translucent, or opaque.

The thickness of an outer layer 104 may be about 0.5-25% of the thickness of a film 100. In some examples, the outer layer is about 2-7% of the thickness of the film 100. In one example, the outer layer 104 is about 2.5% of the thickness of the film 100. In another example, the outer layer 104 is about 5% or less than about 5% of the thickness of the film 100.

Figure 3A:
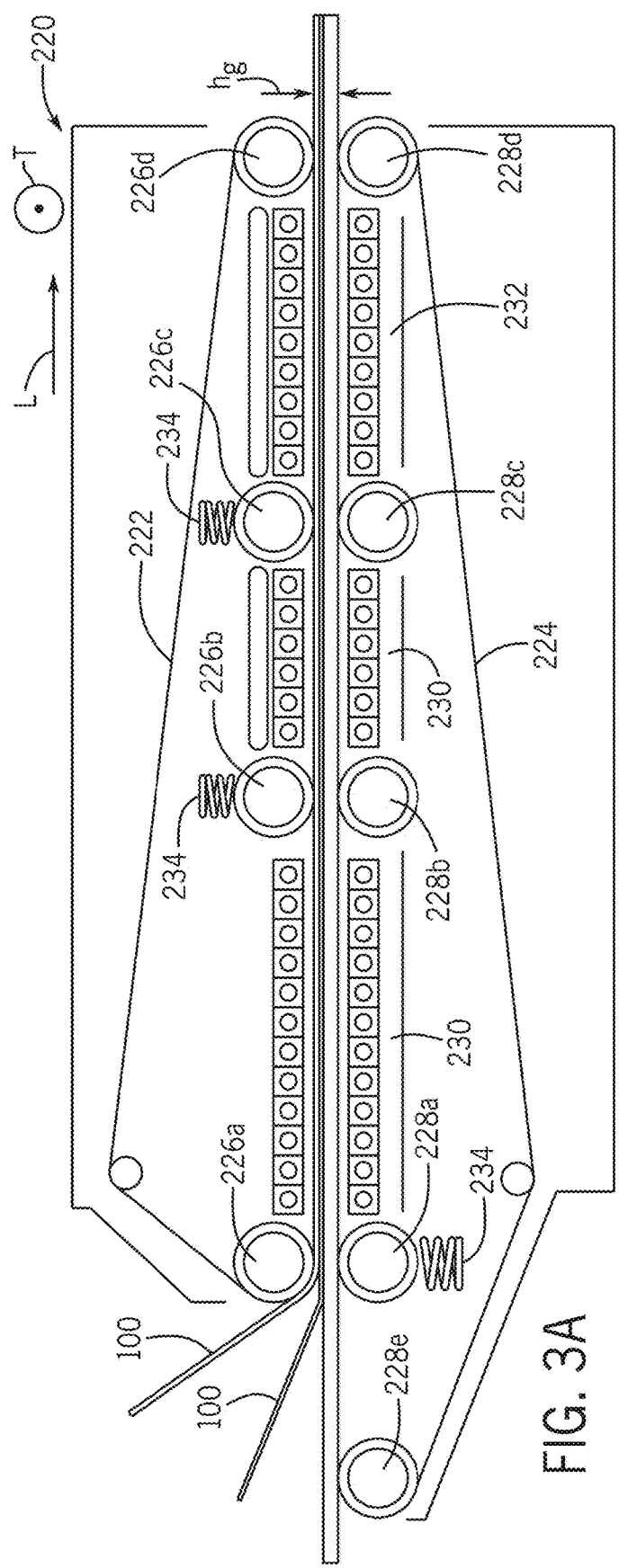
FIG. 3A is an illustration of a system for making the laminate of biaxially orientated thermoplastic polymer films of FIGS. 2A and 2B according to one example.

The film 100 may be stretched in one or both of the transverse and longitudinal directions. In one example, the transverse direction T is defined as the width of a roll of a core 102 or outer layer 104 material, which in one example may be in the direction of the roller 226a, b, or c in FIG. 3A. The longitudinal direction L is defined as the length material of a roll of core 102 or outer layer 104 material extending in a direction orthogonal to the transverse direction, which in one example may be in the machine direction as shown in FIG. 3A. Alternatively, the transverse direction T and the longitudinal direction L may be reversed from that described above and shown in FIG. 3A. The film 100 may be stretched after it is coextruded. The amount of stretching in one direction may be the same as or different than the amount of stretching in the other direction. In some examples, a film 100 is stretched in the transverse direction about 4-15 times (i.e., about 400% to 1500%), about 5-14 times, about 6-13 times, or about 7-12 times. In one example, a film 100 is stretched about 9 times in the transverse direction. In some examples, a film 100 is stretched in the longitudinal direction about 3-10 times, about 4-8 times, or about 4-6 times. In one example, a film 100 is stretched about 5 times in the longitudinal direction. The variable stretching may produce an anisotropic film 100. As a general note, the orientation of the transverse and longitudinal directions that are referenced throughout may be interchangeable. Also in general, the film 100 is stretched to a higher extent in one of transverse or longitudinal directions than in the other of the transverse or longitudinal directions.

The anisotropic film 100 has a tensile strength in each of the transverse and longitudinal directions. The tensile strength in one direction may be different than the tensile strength in the other direction. In some examples, the film 100 has a greater tensile strength in the transverse direction than in the longitudinal direction. In some examples, the film 100 has a greater tensile strength in the longitudinal direction than in the transverse direction. The film 100 may have a tensile strength in the transverse direction of about 150-300 MPa. In one example, the film 100 has a tensile strength in the transverse direction of about 250 MPa. In another example, the film 100 has a tensile strength in the transverse direction of about 207 MPa. The film 100 may have a tensile strength in the longitudinal direction of about 60-190 MPa. In one example, the film 100 has a tensile strength in the longitudinal direction of about 130 MPa. In another example, the film 100 has a tensile strength in the longitudinal direction of about 91 MPa.

The film 100 has a stiffness in each of the transverse and longitudinal directions. The stiffness may be a measure of bending stiffness in which the bending axis is generally orthogonal to the direction of stretching. The stiffness in one direction may be different than the stiffness another other direction. In some examples, the film 100 has a greater stiffness in the transverse direction than in the longitudinal direction. In some examples, the film 100 has a greater stiffness in the longitudinal direction than in the transverse direction. The film 100 may have a greater stiffness in the direction in which it stretched more. For example, a film stretched more in the transverse direction than in the longitudinal direction may have a greater stiffness in the transverse direction than in the longitudinal direction. Similarly, a film stretched more in the longitudinal direction than in the transverse direction may have a greater stiffness in the longitudinal direction than in the transverse direction.

In one direction, the film 100 may have stiffness of about 3.5-5.5 GPa or about 4-4.8 GPa. In the other direction, the film 100 may have stiffness of about 1.5-3 GPa or about 1.9 to 2.3 GPa. In one example, the film 100 is stretched more in the transverse direction and has a stiffness of about 3.5-5.5 GPa in the transverse direction and a stiffness of about 1.5-3 GPa in the longitudinal direction.

In some illustrative examples, the film 100 is constructed of a coextruded core 102 of oriented polypropylene and outer layers 104, constructed of terpolymer of polypropylene, polyethylene, and polybutene, one each on either side of the core 102. In some illustrative examples, the film 100 is constructed of a coextruded core 102 of oriented polypropylene and outer layers 104, constructed of a copolymer of polypropylene and polyethylene, one each on either side of the core 102. For convenience but not limitation, the film 100 may be referred to herein as [PP-BOPP-PP]. The core 102 may have a thickness of about 38 μm±5% and each outer layer 104 may have a thickness of about 1 μm±5%. The film 100 may have a square weight of about 36.4 g/m$^2$±5%. The film 100 may have a melting point of about 169.2±0.4° C. The film 100 may have a tensile strength in the transverse direction of about 207.2±5.4 MPa. The film 100 may have a tensile strength in the longitudinal direction of about 91.2±18.7 MPa. The film 100 may be Tatrafan KXE® (Terichem Ltd., Svit, Slovakia). Tatrafan KXE® is designed for wrapping food products, confectionaries, meat products, textiles, and other goods.

In another example, the film 100 may be constructed of a coextruded core 102 of oriented polypropylene and one outer layer 104 constructed of a copolymer of polypropylene and polyethylene or of a terpolymer of polypropylene, polyethylene, and polybutene. For convenience but not limitation, the film 100 may be referred to herein as [PP-BOPP] or [BOPP-PP]. The film 100 may have a thickness of about 20 µm±5% and may have a square weight of about 22.8 g/m²±5%. The film 100 may be Tatrafan ONXE® (Terichem Ltd., Svit, Slovakia). Tatrafan ONXE® is designed for wrapping food products, confectionaries, meat products, textiles, and other goods.

Figure 2A:
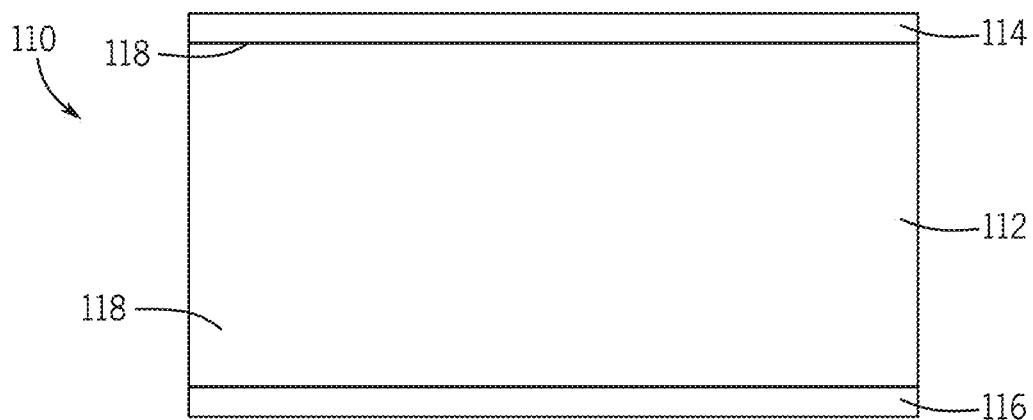
FIG. 2A is an illustration of a laminate of biaxially orientated thermoplastic polymer films according to one example.

Referring to FIG. 2A, a plurality of films 100 form a laminate 110. The number of films 100 in a laminate 110 may be about 3 to about 50 films 100, about 5 to about 50, about 10 to about 50, about 15 to about 50, about 20 to about 50, about 25 to about 50, about 30 to about 50, about 35 to about 50, about 3 to about 40, about 3 to about 35, about 3 to about 30, about 3 to about 25, about 3 to about 20, or about 3 to about 15 films 100. In one example, a laminate 110 includes about 10 to about 50 films. In another example, a laminate 110 includes about 22 to about 35 films 100. In another example, a laminate 110 includes about 3 to about 23 films 100. In a further example, a laminate 110 includes about 24 to about 28 films 100. In another non-limiting example, a laminate 110 may be formed of 22 to 26 film layers of Tatrafan KXE having one film layer of Tatrafan ONXE on each outer side, totaling 24 to 28 films 100. In yet another example, a laminate 110 includes 22 or 23 films 100.

The laminate 110 may include a center 112, a first side or portion 114, and a second side or portion 116. A laminate 110 may include the same number of films 100 in each of the center 112, first side 114, and second side 116, or the numbers may be different. The number of films 100 in the first side 114 and the second side 116 may be the same or different. In one example, the first side 114 and second side 116 have the same number of films 100 and that number is less than the number of films 100 of the center 112. In one example, each of the first side 114 and second side 116 has one film 100 and the center has 10-50 films 100.

The films 100 of the laminate 110 may be of the same type or different types. In one example, a laminate 110 includes a center 112 of one type of film 100, a first side 114 of a second type of film 100, and a second side 116 of a third type of film 100. In another example, a laminate 110 includes a center 112 of one type of film 100 and a first side 114 and second side 116, each of a second type of film 100.

In one example, the center 112 is constructed of a plurality of [PP-BOPP-PP]films 100. When a plurality of [PP-BOPP-PP] films 100 are laminated together, two PP layers, which may be PP/PE copolymers or PP/PE/PB terpolymers as described above, are positioned adjacent each other.

In one example, each of the first side 114 and second side 116 may be constructed of at least one [PP-BOPP] or [BOPP-PP] film 100. When a [PP-BOPP] or [BOPP-PP] film 100 is laminated with a [PP-BOPP-PP] film 100, two PP layers, which may be PP/PE copolymers or PP/PE/PB terpolymers as described above, may be positioned adjacent each other.

In one example, one or both of the first side 114 and second side 116 of the laminate 110 may be constructed of at least one BOPET-BOPP, BOPP-BOPET, or BOPET-BOPP-BOPET film 100. In one example, the BOPET portion of the film 100 may be positioned on the outermost surface of the first side 114 or second side 116. Positioning BOPET on the outermost surface of first side 114 or second side 116 may help achieve improved scratch resistance of the laminate 110 or an article formed from the laminate 110.

Figure 2B:
FIG. 2B is an illustration of the layers of films in the laminate of FIG. 2A.

In one example, and with reference to FIG. 2B, the laminate 110 has the arrangement of films 100 represented by [BOPP-PP]-[PP-BOPP-PP]$_n$-[PP-BOPP], where n is the number of films 100. The [PP-BOPP-PP] films 100 may be Tatrafan KXE®. The [PP-BOPP] and [BOPP-PP] films 100 may be Tatrafan ONXE®.

As described above, a film 100 may be stretched in one or both of the transverse and longitudinal directions. In the laminate, the films 100 may be oriented in the same direction as an immediately adjacent film 100. For example, two films 100 stretched more in the transverse direction than in the longitudinal direction may be immediately adjacent to each other. In other words, two immediately adjacent films 100 may be rotated 0° relative to each other in regards to the degree of stretching. Alternatively, two immediately adjacent films 100 may be rotated 90° relative to each other. For example, one film 100 stretched more in the transverse direction than in the longitudinal direction may be immediately adjacent to a film 100 stretched more in the longitudinal direction than in the transverse direction. At least two films 100 in the laminate 110 may be oriented in the same direction. In one example, all films 100 in at least the center 112 of the laminate 110 are oriented in the same direction. In another example, all films 100 in the laminate 110 are oriented in the same direction.

The laminate 110 may have a thickness of about 0.25 to about 2.5 mm, about 0.3 to about 2.5 mm, about 0.5 to about 2.5 mm, about 0.75 to about 2.5 mm, about 1.0 to about 2.5 mm, about 1.25 to about 2.5 mm, about 1.5 to about 2.5 mm, about 0.25 to about 2.25 mm, about 0.25 to about 2.0 mm, about 0.25 to about 1.75 mm, about 0.25 to about 1.5 mm, about 0.25 to about 1.25 mm, or about 0.25 to about 1.00 mm. In one example, the laminate 110 has a thickness of about 0.5 to about 2 mm. In another example, the laminate 110 has a thickness of about 0.9 to about 1.5 mm. In yet another example, the laminate 110 has a thickness of about 0.5 mm to less than about 1.0 mm.

The first side 114 may have the same thickness as the second side 116 or may have a different thickness. The thickness of the center 112 may be greater than the thickness of the first side 114 or the thickness of the second side 116 or the thickness of each of the first side 114 and second side 116. The thickness of the center 112 may be greater than the thickness of the first side 114 and second side 116 combined.

The anisotropic properties of the films 100 may be imparted to the laminate 110 in which the films 100 are incorporated. For example, the laminate 110 has a tensile strength in one direction that is different than the tensile strength in the other direction. In some examples, the laminate 110 has a greater tensile strength in the transverse direction than in the longitudinal direction. In some examples, the laminate 110 has a greater tensile strength in the longitudinal direction than in the transverse direction. The laminate 110 may have a tensile strength in the transverse direction of about 100-250 MPa, or about 150-200 MPa. The laminate 110 may have a tensile strength in the longitudinal direction of about 50-150 MPa, or about 70-100 MPa.

In one example, the laminate 110 is clear, colorless, and transparent, translucent, or opaque. In another example, the core 102 of at least one film 100 is constructed of a colored film 100, such as a PP, BOPP, or other type of film 100, that introduces color to the laminate 110.

The laminate 110 may include one or more auxiliary materials 118 in addition to the films 100 of the center 112, first side 114, and second side 116. In the construction and design of the laminate 110, an auxiliary material 118 may introduce a color, print, pattern, or design to the laminate 110. In some examples, the auxiliary material 118 is constructed of a solid film, such as a cast polypropylene film, which may be constructed of the same polymer as the outer layer 104. In some examples, the auxiliary material 118 includes a core 102 and at least one outer layer 104. As described above, the outer layer 104 may have a lower melting temperature than the core 102. The auxiliary material, or the outer layer 104 when present, may have a melting temperature of about 130° C. or lower.

The auxiliary material 118 may be introduced within the plurality of films 100 of the center 112, first side 114, or second side 116. Alternatively, the auxiliary material 118 may be introduced between the center 112 and first side 114 or the center 112 and second side 116. As another alternative, the auxiliary material 118 may be introduced on the outer surface of the first side 114 or the exterior of the second side 116 as the outermost layer (top film) of the laminate 110. The auxiliary material 118 may be coextruded with the films 100 of the laminate 110. Examples of auxiliary materials 118 include thermoplastic olefin films, printed films, colored polypropylene and/or polyethylene films, white or colored BOPP films, metallized BOPP films, short or chopped polypropylene fibers, short or chopped bicomponent (BICO) fibers, knitted fabrics, woven fabrics, nonwoven fabrics, polypropylene and/or polyethylene powder, and combinations thereof.

A laminate 110 may be formed by laminating a plurality of films 100 under predetermined pressure, temperature, and/or time conditions. The laminate 110 may be formed in a laminating machine. The laminating machine may be an isochoric press or an isobaric press. The laminating machine may include at least one roller, which may be a fixed roller or a circulating roller. In an isochoric press, constant volume is maintained, such as by maintaining a constant gap distance between pressure applicators, such as in one example opposing rollers spaced apart a fixed distance. In an isochoric press, and for example one using a circulating roller pressure module, a combination of constant volume and constant uniform pressure is maintained or attempted to be maintained. The rollers in an isochoric press may be fixed in position relative to the laminating machine, or may move relative to the laminating machine, such as in a circulating roller pressure module. The pressure applied by an isochoric press having fixed rollers is generally referred to as "line pressure," measured in kN/m. The pressure is applied, for example, by at least one roller, and in at least one other example the line pressure is applied to the material being formed as it passes through the gap between opposing fixed rollers. In an isochoric press using a circulating roller pressure module, the pressure is applied between opposing rollers as the rollers circulate in the pressure module. Because typically the rollers used in a fixed roller press are larger (in one example, approximately 100 mm) compared to the rollers used in a circulating roller pressure module (in one example, approximately 25-40 mm) there is a smaller pressure drop between the adjacent rollers. The pressure applied in a circulating roller pressure module, because of the smaller pressure drop between adjacent rollers, may be considered to be, or estimated as, a pressure applied over an area of the material being formed. As a result, the pressure applied by a circulating roller pressure module is often measured as "bar."

In an isobaric press, constant uniform pressure is maintained, such as by permitting the gap distance between pressure applicators to be defined by the infeed material. The pressure applied by an isobaric press is generally surface pressure, measured in kN/m² or bar, applied, for example, by at least one oil cushion. In other examples, the pressure applicators are opposing oil cushions spaced apart by a gap. As used herein, "bar" generally but not exclusively refers to a surface pressure generated by an isobaric press or an isochoric press including circulating rollers. As used herein, "kN/m" generally but not exclusively refers to a line pressure generated by an isochoric press having fixed rollers. Examples of laminating press equipment that may be utilized for this type of forming method, either isochoric or isobaric, or implementing a combination of both methods, may be manufactured by Sandvik, such as the Sandvik ThermoPress CB (CombiPress) (see http://processsystems.sandvik.com).

In some examples, the laminating machine is an isobaric press. In other examples, and with reference to FIG. 3A, the laminating machine may be a double belt isochoric press 220 having fixed rollers. The press 220 includes an upper belt 222, a lower belt 224, a plurality of upper rollers 226, and a plurality of lower rollers 228. Some or all of the rollers 226, 228 may be operatively connected to springs 234, which help adjust the pressure applied by the rollers 226, 228 to material passing between the rollers 226, 228. The press 220 may also include at least one integrated heating zone 230 and at least one integrated cooling zone 232.

The belts 222, 224 may be constructed of Teflon or steel. The belts 222, 224 may be conveyor belts. The upper belt 222 operatively connects at least two upper rollers 226, such as four upper rollers 226a, 226b, 226c, and 226d. The lower belt 224 operatively connects at least two lower rollers 228, such as five lower rollers 228a, 228b, 228c, 228d, and 228e. An upper roller 226a, 226b, 226c, 226d and a corresponding lower roller 228a, 228b, 228c, 228d, respectively, may be positioned opposite each other on either side of films 100 being laminated.

The distance or gap height, hg, between an upper roller 226 and a corresponding lower roller 228 may be adjustable. The gap height may be the same or different between each pair of rollers 226a, 228a, 226b, 228b, 226c, 228c, 226d, 228d. Adjusting the gap height may help adjust or maintain the pressure applied by the rollers 226, 228, may help maintain a uniform volume of material between the rollers 226, 228, and may help control the thickness of the laminate 110. In one example, the gap height is about 0.7 mm to about 1.2 mm. In another example, the gap height is about 0.95 mm to about 1.0 mm.

The belts 222, 224 and rollers 226, 228 may help advance a plurality of films 100 through the press 220. The plurality of films 100 may move through the press at a constant or variable rate. Adjusting the rate may permit the application of a pressure or a temperature to the films 100 for varying amounts of time. The rate may be from about 1 m/min to about 8 m/min, about 2 m/min to about 8 m/min, about 3 m/min to about 8 m/min, about 4 m/min to about 8 m/min, about 5 m/min to about 8 m/min, about 1 m/min to about 7 m/min, about 1 m/min to about 6 m/min, about 1 m/min to about 5 m/min, about 1 m/min to about 4 m/min, about 1 m/min to about 3 m/min, or about 2 m/min to about 6 m/min. In one example, the rate is about 2 m/min. In another example, the rate is about 6 m/min.

In one example, the press 220 is a Flatbed Laminator System (Meyer, Roetz, Germany).

Figure 4A:
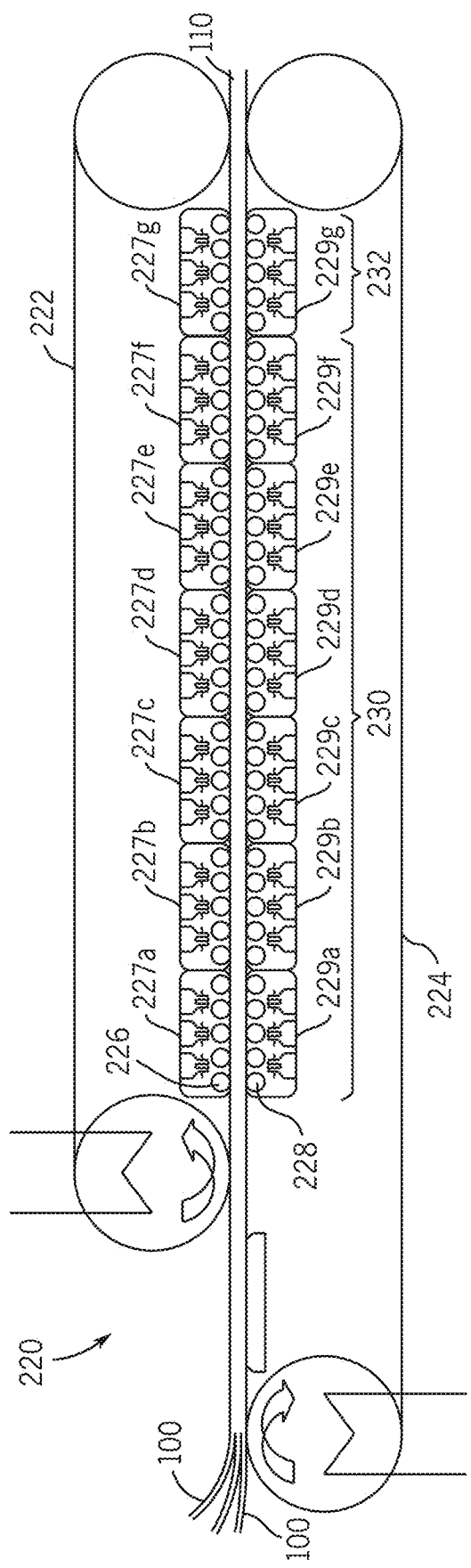
FIG. 4A is an illustration of a system for making the laminate of biaxially orientated thermoplastic polymer films of FIGS. 2A and 2B according to another example.

FIG. 4A illustrates another example of a laminating machine that is a double belt isochoric press 220 having fixed rollers. The press 220 includes an upper belt 222, a lower belt 224, a plurality of upper rollers 226, and a plurality of lower rollers 228. The press 220 may also include at least one integrated heating zone 230 and at least one integrated cooling zone 232.

The belts 222, 224 may be constructed of Teflon or steel. The belts 222, 224 may be conveyor belts. The upper belt 222 operatively connects at least two upper pressure modules 227, such as seven upper pressure modules 227a, 227b, 227c, 227d, 227e, 227f, and 227g. The lower belt 224 operatively connects at least two lower pressure modules 229, such as seven lower pressure modules 229a, 229b, 229c, 229d, 229e, 229f, and 229g. An upper pressure module 227a, 227b, 227c, 227d, 227e, 227f, and 227g and a corresponding lower pressure module 229a, 229b, 229c, 229d, 229e, 229f, and 229g, respectively, may be positioned opposite each other on either side of films 100 being laminated.

Each pressure module 227, 229 may have the same width or different widths. In one example, each pressure module 227, 229 is about 1000 mm wide.

Each upper pressure module 227a-g may include one or more upper rollers 226. Similarly, each lower pressure module 229a-g may include one or more lower rollers 228. The number of upper rollers 226 may be the same or different for each upper pressure module 227. The number of lower rollers 228 may be the same or different for each lower pressure module 229. The number of upper rollers 226 may be the same as or different from the number of lower rollers 228. With reference to FIG. 4A, an upper pressure module 227 may include 5 upper rollers 226 and a lower pressure module 229 may include 5 lower rollers 228. In the design and operation of a press 220, the rollers 226, 228 may create line pressure on the material, such as films 100 or laminate 110, positioned between the upper rollers 226 and lower rollers 228.

The belts 222, 224 and pressure modules 227, 229 or rollers 226, 228 may help advance a plurality of films 100 through the press 220. The plurality of films 100 may move through the press at a constant or variable rate. Adjusting the rate may permit the application of a pressure or a temperature to the films 100 for varying amounts of time. The rate may be from about 1 m/min to about 8 m/min, about 2 m/min to about 8 m/min, about 3 m/min to about 8 m/min, about 4 m/min to about 8 m/min, about 5 m/min to about 8 m/min, about 1 m/min to about 7 m/min, about 1 m/min to about 6 m/min, about 1 m/min to about 5 m/min, about 1 m/min to about 4 m/min, about 1 m/min to about 3 m/min, or about 2 m/min to about 6 m/min. In one example, the rate is about 2 m/min. In another example, the rate is about 6 m/min.

In one example, the press 220 is a double steel belt isochoric thermopress (Sandvik Process Systems, Sandviken, Sweden).

Figure 4B:
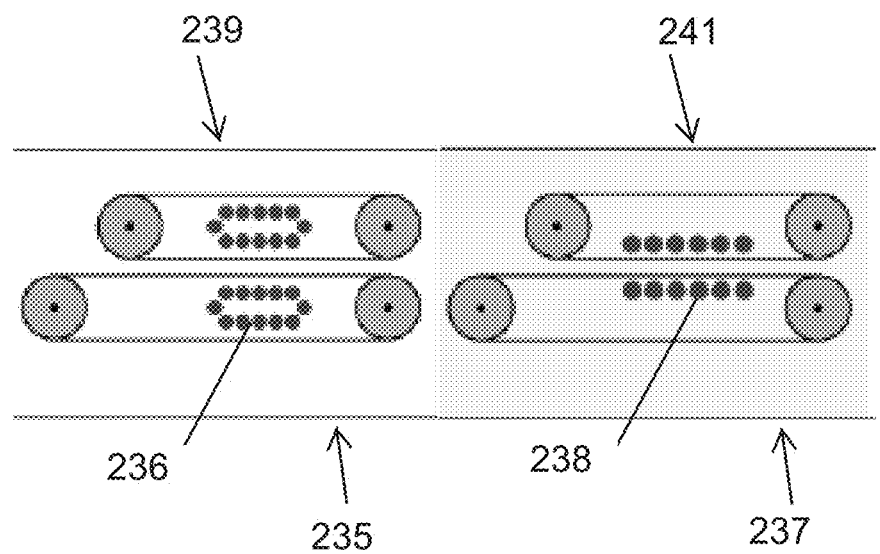
FIG. 4B is an illustration of a system for making the laminate of biaxially orientated thermoplastic polymer films of FIGS. 2A and 2B according to another example.

In some examples, and with reference to FIG. 4B, the laminating machine may be an isochoric press having at least one module 235 including circulating rollers 236 and at least one module 237 including fixed rollers 238. The material being formed moves from left to right in this example, first through the circulating rollers 236 and then through the fixed rollers 238. The circulating rollers 236 of the isochoric press may apply surface pressure measured in bar. The fixed rollers 238 of the isochoric press may apply line pressure measured in kN/m. In one example, a heating zone 239, such as in integrated heating zone 230 (see FIG. 3A), may include a plurality of circulating rollers 235. In one example, a cooling zone 241, such as an integrated cooling zone 232 (see FIG. 3A) may include a plurality of fixed rollers 238.

Figure 5:
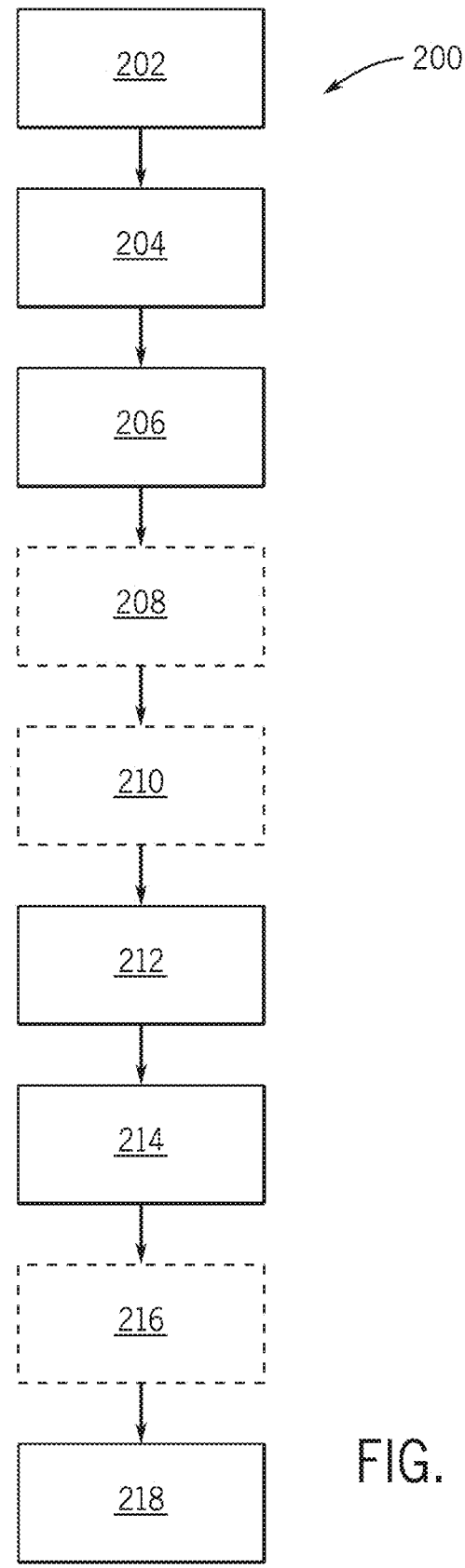
FIG. 5 is a block diagram of the steps of a method of making the laminate of biaxially orientated thermoplastic polymer films of FIGS. 2A and 2B according to one example.

Referring to FIG. 5, a method 200 of making a laminate 110 may include a step 202 of introducing a plurality of films 100 into a laminating machine, a step 204 of applying a first pressure to the films 100, a step 206 of applying a first temperature to the films 100 for a first time, a step 212 of applying a second pressure to the films 100, a step 214 of applying a second temperature to the films 100 for a second time, and a step 218 of releasing the laminate 110 from the machine. In some embodiments, the method includes one or more of a step 208 of applying a third pressure to the films 100, a step 210 of applying a third temperature to the films 100 for a third time, and a step 216 of applying a fourth pressure to the films 100. The method 200 may be a continuous process as opposed to a batch process.

When temperature is applied to the films 100 in any one or more of steps 206, 210, 214, the temperature may be high enough to melt or partially melt the outer layer 104 but not high enough to melt the core 102.

In the method 200 of making the laminate 110, the outer layer 104 may be melted. Instead of or in addition to melting the outer layer 104, the outer layer 104 and core 102, or films 100 within or between the outer layer 104 and core 102, may be cross-linked with each other, or otherwise bonded with each other, such as by chemical, physical, or adhesive bonding. Melting, cross-linking, and/or otherwise bonding films 100 may help produce a laminate 110 with improved physical properties, such as stiffness, tensile strength, and strain to failure.

In step 202, a plurality of films 100 is introduced into a laminating machine. The laminating machine may be any machine described above, such as an isochoric or isobaric press.

In step 204, the plurality of films 100 are subjected to a first pressure $P_1$. Applying pressure may help laminate the films 100 together and may help produce a laminate 110 with a high bonding strength. Referring to FIG. 3A, the pressure may be applied by a pair of rollers, such as an upper roller 226a positioned on the opposite side of the films 100 from a corresponding lower roller 228a. The pressure may be applied to the portion of the films 100 positioned between the rollers 226a, 228a as the films 100 move through the rollers 226a, 228a at any rate described above, such as about 2 m/min. In other examples, such as with isobaric presses, the pressure (surface pressure) is applied by at least one oil cushion. $P_1$ may be less than about 10 bar, such as about 1 to about 9 bar, about 1 to about 8 bar, about 1 to about 7 bar, about 1 to about 6 bar, about 1 to about 5 bar, about 1 to about 4 bar, about 1 to about 3 bar, or about 1 to about 2 bar. When $P_1$ is measured in kN/m (line pressure), $P_1$ may be less than about 40 kN/m, such as about 5 to about 35 kN/m or about 10 to about 30 KN/m.

Figure 3B:
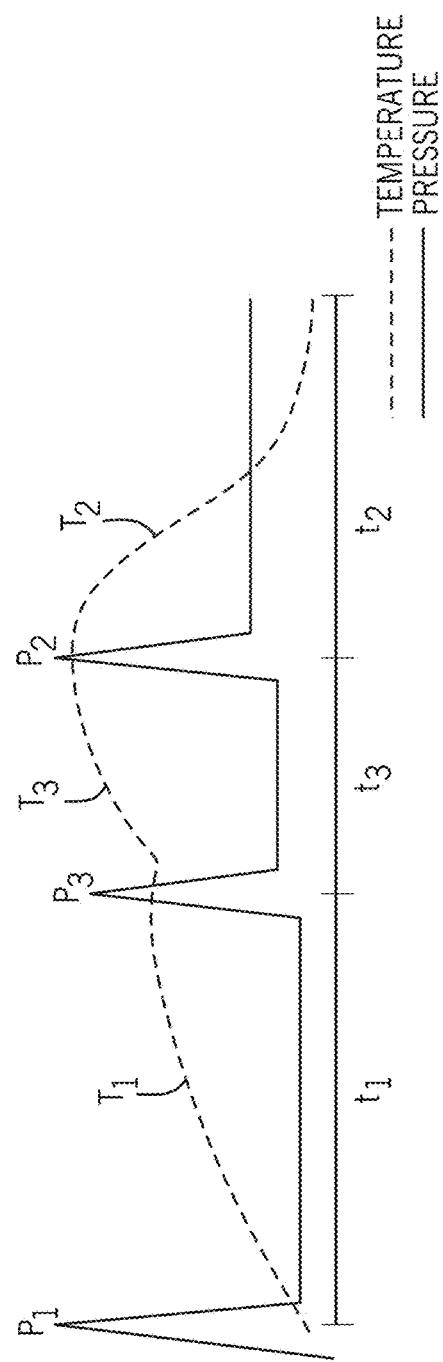
FIG. 3B is an illustration of the temperature and pressure changes of the films during the process of FIG. 3A.

Referring to FIG. 3B, when $P_1$ is applied to the films 100 by the rollers, the films 100 may experience a spike in pressure. As shown in FIG. 3B, in the space between the opposing rollers the pressure level in the films 100 is reduced until the next pair of opposing rollers are encountered.

Referring again to FIG. 5, in step 206, the plurality of films 100 are heated to a first temperature $T_1$ for a first time $t_1$. When $T_1$ is greater than ambient temperature, the heat may help laminate the films 100 together and may help produce a laminate 110 with a high bonding strength. When $T_1$ is at or near the melting point of the outer layer 104 of the films 100, the outer layer 104 may start to melt or become tacky. When $T_1$ is at or near the melting point of the core 102, the core 102 may start to relax and/or shrink. Referring to FIG. 3A, the temperature may be controlled in a heating zone 230. $T_1$ may be about 90° C. to about 150° C., about 100° C. to about 150° C., about 110° C. to about 150° C., about 120° C. to about 150° C., about 130° C. to about 150° C., about 90° C. to about 140° C., about 90° C. to about 130° C., about 90° C. to about 120° C., or about 90° C. to about 110° C. In one example, $T_1$ is about 130° C. or less. In another example, $T_1$ is about 110° C. to about 140° C. In another example, $T_1$ is about 105° C. to about 135° C. In yet another example, $T_1$ is about 110° C. to about 130° C. In yet another example, $T_1$ is about 115° C. to about 120° C. To achieve the desired $T_1$, the temperature of a heating element used to heat the films 100 may be at a higher temperature.

First time t, may be from about 15-120 seconds, about 30-120 seconds, about 45-120 seconds, about 60-120 seconds, about 75-120 seconds, about 90-120 seconds, about 15-90 seconds, about 15-75 seconds, about 15-60 seconds, about 15-45 seconds, or about 15-30 seconds, or about 30-90 seconds. In one example, t, is 45-55 seconds.

Referring to FIG. 3B, when the plurality of films 100 is heated to $T_1$, the temperature of the films 100 may increase over time $t_1$. The pressure experienced by the films 100 may remain constant and lower than $P_1$ during $t_1$.

Although shown as sequential steps in FIG. 5, in some embodiments, steps 204 and 206 may occur simultaneously. In general, the steps 202, 204, 206, 208 (when present), 210 (when present), 212, 214, 216 (when present), and 218 may be performed in the order depicted in FIG. 5 or in a different order.

In step 212, as shown in FIG. 5, the plurality of films 100 are subjected to a second pressure $P_2$. Applying pressure may help laminate the films 100 together and may help produce a laminate 110 with a high bonding strength. In some implementations, the application of pressure following the application of heat during t, may help press the films together or may help define a thickness of the laminate 110. Referring to FIG. 3A, the pressure may be applied by a pair of rollers, such as an upper roller 226c positioned on the opposite side of the films 100 from a corresponding lower roller 228c. The pressure may be applied to the portion of the films 100 positioned between the rollers 226c, 228c as the films 100 move through the rollers 226c, 228c at any rate described above, such as about 2 m/min. In other examples, such as with isobaric presses, the pressure (surface pressure) is applied by an oil cushion. $P_2$ may be the same as or different from $P_1$. $P_2$ may be less than about 10 bar, such as about 1 to about 9 bar, about 1 to about 8 bar, about 1 to about 7 bar, about 1 to about 6 bar, about 1 to about 5 bar, about 1 to about 4 bar, about 1 to about 3 bar, or about 1 to about 2 bar. When $P_2$ is measured in kN/m (line pressure), $P_2$ may be less than about 40 kN/m, such as about 5-35 kN/m or about 10-30 KN/m.

Referring to FIG. 3B, when $P_2$ is applied to the plurality of films 100, the films 100 may experience a spike in pressure. The pressure may be about the same as $P_1$.

In step 214, as shown in FIG. 5, the plurality of films 100 are subjected to a second temperature $T_2$ for a second time $t_2$. When $T_2$ is ambient temperature or less, the cooler temperature may help stabilize the laminate 110. Referring to FIG. 3A, the temperature may be controlled in a cooling zone 232. The temperature may be controlled by, for example, circulating water through tubes in the cooling zone 232 or by spraying water on one or more belts 222, 224 in the cooling zone 232. $T_2$ may be about 10° C. to about 30° C., about 15° C. to about 30° C., about 20° C. to about 30° C., about 25° C. to about 30° C., about 10° C. to about 25° C., about 10° C. to about 20° C., or about 10° C. to about 15° C. In one example, $T_2$ is about 15° C. to about 25° C.

Second time $t_2$ may be from about 2-90 seconds, about 5-90 seconds, about 10-90 seconds, about 20-90 seconds, about 30-90 seconds, about 40-90 seconds, about 50-90 seconds, about 60-90 seconds, about 2-60 seconds, about 2-50 seconds, about 2-40 seconds, about 2-30 seconds, about 2-20 seconds, about 2-10 seconds, or about 10-60 seconds.

Referring to FIG. 3B, when $T_2$ is applied to the plurality of films 100, the temperature of the films 100 may decrease over time $t_2$. The temperature of the films 100 may fall below the starting temperature at the beginning of $t_1$. During $t_2$, the pressure experienced by the films 100 may remain constant and lower than $P_2$. The pressure may be atmospheric pressure. In some embodiments, the plurality of films 100 are cooled in the absence of applied pressure.

Although shown as sequential steps in FIG. 5, in some embodiments, steps 212 and 214 may occur simultaneously.

The pressures and temperatures applied during the course of the method 200 are effective to laminate the plurality of films 100 together to form a laminate 110. In step 218, as shown in FIG. 5, the laminate 110 is released from the laminating machine.

In some embodiments, the method 200 includes a step 208 of subjecting the plurality of films 100 to a third pressure $P_3$. Applying pressure may help laminate the films 100 together and may help produce a laminate 110 with a high bonding strength. In some implementations, the application of pressure following the application of heat during t, may help press the films together or may help define a thickness of the laminate 110. Referring to FIG. 3A, the pressure may be applied by a pair of rollers, such as an upper roller 226b positioned on the opposite side of the films 100 from a corresponding lower roller 228b. The pressure may be applied to the portion of the films 100 positioned between the rollers 226b, 228b as the films 100 move through the rollers 226b, 228b at any rate described above, such as about 2 m/min. In other examples, such as with isobaric presses, the pressure (surface pressure) is applied by at least one oil cushion. $P_3$ may be the same as or different from $P_1$ or $P_2$. $P_3$ may be less than about 10 bar, such as about 1 to about 9 bar, about 1 to about 8 bar, about 1 to about 7 bar, about 1 to about 6 bar, about 1 to about 5 bar, about 1 to about 4 bar, about 1 to about 3 bar, or about 1 to about 2 bar. When $P_3$ is measured in kN/m (line pressure), $P_3$ may be less than about 40 kN/m, such as about 5-35 kN/m or about 10-30 KN/m.

As shown in FIG. 3B, when $P_3$ is applied to the plurality of films 100, the films 100 may experience a spike in pressure. The pressure may be less than each of $P_1$ and $P_2$.

In some embodiments, the method 200 includes a step 210 of subjecting the plurality of films 100 to a third temperature $T_3$ for a third time $t_3$. When $T_3$ is greater than ambient temperature, the heat may help laminate the films 100 together and may help produce a laminate 110 with a high bonding strength. Referring to FIG. 3A, the temperature may be controlled in a heating zone 230. $T_3$ may be about 90° C. to about 150° C., about 100° C. to about 150° C., about 110° C. to about 150° C., about 120° C. to about 150° C., about 130° C. to about 150° C., about 90° C. to about 140° C., about 90° C. to about 130° C., about 90° C. to about 120° C., or about 90° C. to about 110° C. In one example, $T_3$ is about 130° C. or less. In another example, $T_3$ is about 110° C. to about 140° C. In yet another example, $T_3$ is about 110° C. to about 130° C.

Referring to FIG. 3B, when $T_3$ is applied to the plurality of films 100, the temperature of the films 100 may increase over time $t_3$. The temperature of the films 100 during $t_3$ may be greater than the temperature of the films 100 during each of t, and $t_2$. The pressure experienced by the films 100 during $t_3$ may remain constant and lower than each of $P_1$, $P_2$, and $P_3$.

Referring again to FIG. 5, in optional step 216, the plurality of films 100 are subjected to a fourth pressure $P_4$. Applying pressure may help laminate the films 100 together and may help produce a laminate 110 with a high bonding strength. Referring to FIG. 3A, the pressure may be applied by a pair of rollers, such as an upper roller 226d positioned on the opposite side of the films 100 from a corresponding lower roller 228d. The pressure may be applied to the portion of the films 100 positioned between the rollers 226d, 228d as the films 100 move through the rollers 226d, 228d at any rate described above, such as about 2 m/min. In other examples, such as with isobaric presses, the pressure (surface pressure) is applied by an oil cushion. $P_4$ may be the same as or different from any of $P_1$, $P_2$. or $P_3$. $P_4$ may be less than about 10 bar, such as about 1 to about 9 bar, about 1 to about 8 bar, about 1 to about 7 bar, about 1 to about 6 bar, about 1 to about 5 bar, about 1 to about 4 bar, about 1 to about 3 bar, or about 1 to about 2 bar. When $P_4$ is measured in kN/m (line pressure), $P_4$ may be less than about 40 kN/m, such as about 5-35 kN/m or about 10-30 KN/m. In some embodiments, no pressure is applied and $P_4$ is about 1 bar or atmospheric pressure.

The laminate 110 produced by the method 200 may demonstrate a reduced level of shrinkage, and in some examples may only experience minimal shrinkage. For example, the laminate 110 may demonstrate about 1% shrinkage at 110° C.

Luggage Articles Constructed of Laminates of Biaxially Oriented Thermoplastic Polymer Films A luggage shell 120, such as a suitcase shell, may be constructed of a laminate 110 disclosed herein. Referring to FIGS. 6A and 6B, the luggage shell 120 may be in the form of a lid shell 122 (FIG. 6A) or a base shell 134 (FIG. 6B). The lid shell 122 includes a rear side 124, a lid top side 126, a lid bottom side 128, a lid right side 130, a lid left side 132, and one or more corner portions 146. The base shell 134 includes a front side 136, a base top side 138, a base bottom side 140, a base right side 142, a base left side 144, and one or more corner portions 146. Each corner portion 146 may be an indentation for receiving a wheel when the shell 120 is used in a luggage article.

Any one or more of the sides 124, 126, 128, 130, 132, 136, 138, 140, 142, 144, or corner portions 146 may include surface features 148. The features may be positioned along the length, along the width, or at an angle of the sides 124, 126, 128, 130, 132, 136, 138, 140, 142, 144, or corner portions 146. The features 148 may be concave areas, such as grooves 147, and convex areas, such as ribs 149, which may alternate. The features 148 may be aesthetically pleasing. The features 148 may also help provide stiffness or resistance to bending or distortional forces exerted against the shell 120, such as forces exerted orthogonally to the features 148.

One or both of the base shell 122 and the lid shell 134 may be formed of a laminate 110 of a plurality of films 100 described above. In brief, the films 100 may be coextruded and may comprise a core 102 of oriented polypropylene and at least one outer layer 104 positioned adjacent to the core 102.

The outer layer 104 may be constructed and designed as described above. In one example, the outer layer 104 is constructed of a copolymer of polypropylene and polyethylene. In another example, the outer layer 104 is constructed of a terpolymer of polypropylene, polyethylene, and polybutene. The outer layer 104 may have a thickness of less than about 5% of the thickness of a film 100. In one example, the outer layer 104 is about 2.5% of the thickness of a film 100.

The plurality of films 100 that form the laminate 110 from which the luggage shell 120 is constructed may be any number of films 100 described above. From about 10 to about 50 films, about 22 to about 35 films, 22 films, or 23 films, may form the laminate 110. At least two adjacent films 100 are oriented in the same direction. In one example, all films 100 are oriented in the same direction.

The thickness of the laminate 110 from which the luggage shell 120 is constructed may be any thickness described above. For example, the thickness of the laminate 110 may be about 0.5 mm to about 2 mm or may be about 0.5 mm to less than about 1 mm.

One or both of the base shell 122 and the lid shell 134 may be deep drawn such that the depth of the base shell 122 or the lid shell 134 is quite large relative to its length or width. For example, the depth of the lid top side 126 and lid bottom side 128 may be up to one half the length or one half the width of the rear side 124. As another example, the depth of the base top side 138 or base bottom side 140 may be up to one half the length or one half the width of the front side 136.

Figure 7A:
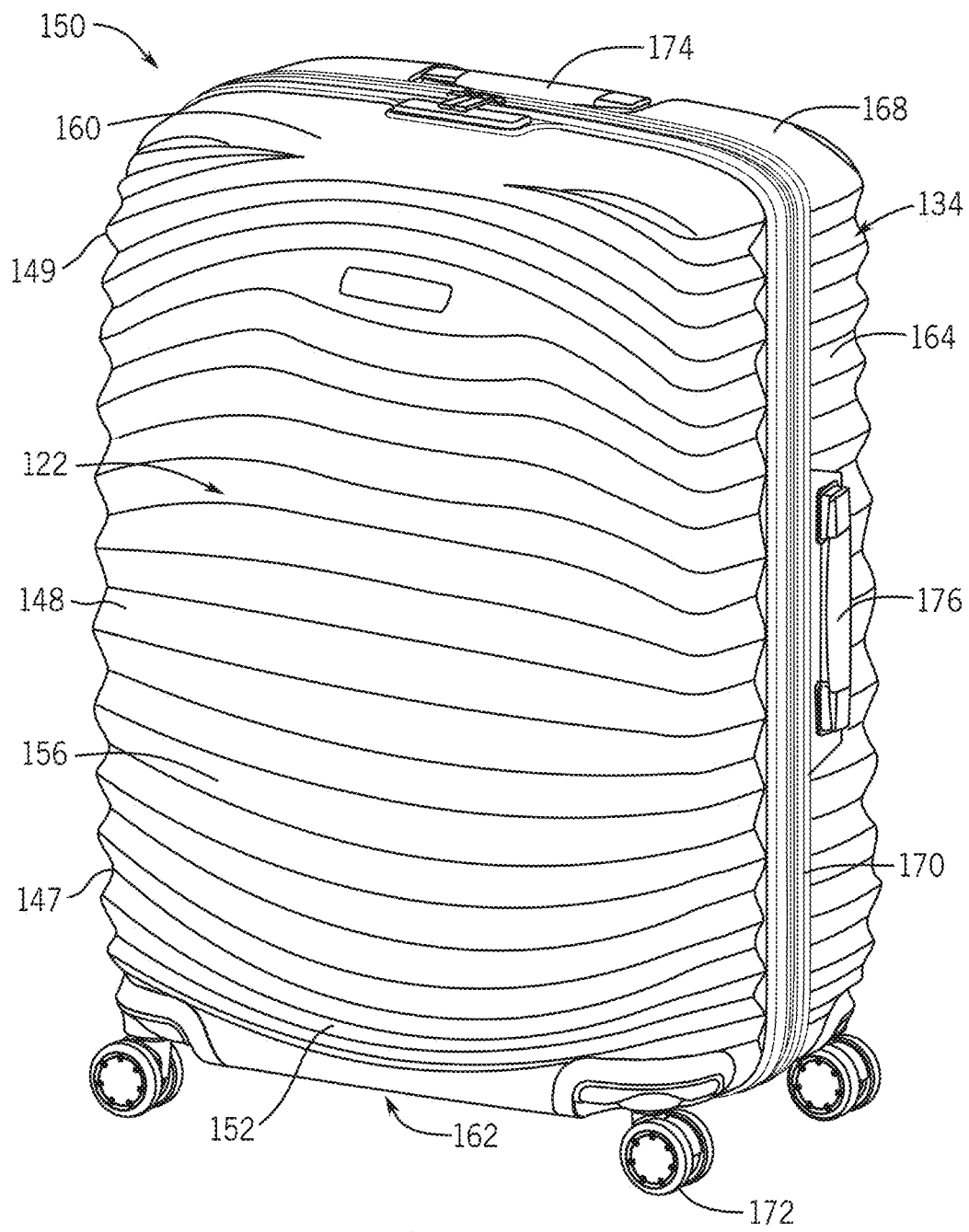
FIG. 7A is a front isometric view a luggage case including the luggage shell of FIG. 5A.
Figure 7B:
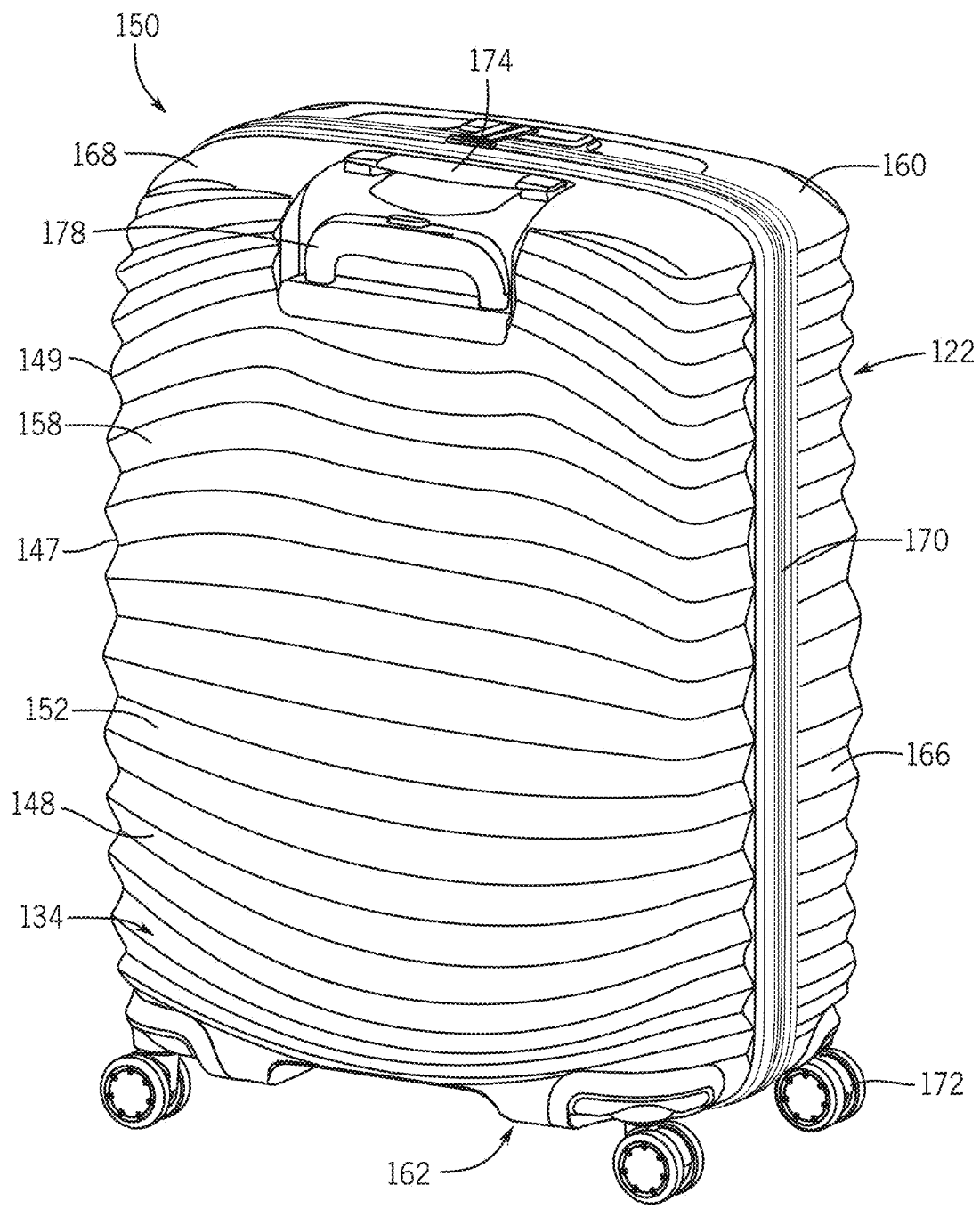
FIG. 7B is a rear isometric view of the luggage of FIG. 7A.

Any luggage shell 120 described above may be used to form the body of a luggage case 150, such as a hard-sided luggage case. Referring to FIGS. 7A and 7B, a hard sided luggage case 150 is defined by a lid shell 122 and a base shell 134 operably coupled together to form a housing 152 having by an exterior layer 154. Either or both of the lid shell 122 and base shell 134 may be produced by any aforementioned method. The exterior layer 154 may have a textured surface or a shaped surface.

The luggage case 150 includes a front panel 156, a rear panel 158, a top panel 160, a bottom panel 162, a right side panel 164, and a left side panel 166. Corner regions 168 are defined by the intersection of any two or three adjacent panels 156, 158, 160, 162, 164, and 166. For example, the luggage case 150 includes four upper corner regions and four lower corner regions, each formed by the intersection of three adjacent panels. Additionally, the edges formed by the intersection of any two adjacent panels may also be considered a corner region. The panels 156, 158, 160, 162, 164, 166 as described herein may also be referred to as "sides." Thus, a first side, a second side, and/or a third side of the luggage case 150 may each be any of the various panels 156, 158, 160, 162, 164, 166 described herein. The luggage case 150 may also include a closure mechanism, such as a zipper, that extends along the central portions of the side panels 164, 166 and the top and bottom panels 160, 162, and defines a line of closure 170, which divides the luggage case 150 into the lid shell 122 and the base shell 134. A hinge (not shown) for pivotally connecting the lid shell 122 and base shell 134 together is positioned along the line of closure 170. The zipper can be unzipped to allow the lid shell 122 and base shell 134 to pivot about the hinge portion to allow access to the interior. Various types of closure mechanisms, such as a latch, and hinge structures are acceptable. The luggage case 150 also may include four wheels 172 that spin about a vertical axis as shown, or may include other wheel or support structures, to allow the user to pull or tow the luggage case 150 at an angle, or to guide it along in an upright position. The luggage case 150 may include a top carry handle 174 on the top panel 160 and a side carry handle 176 on a side panel 164, 166. The luggage case 150 may also include an extendable pull handle 178. The pull handle 178 may be aligned along the outside of the rear panel 158 of the luggage case 150. Alternatively, the pull handle 178 may also be aligned along the rear panel 158 but positioned inside the luggage case 150.

A laminate 110 may be molded into an article, such as a luggage shell 120. In the construction of the article, forming the laminate 110 in a process performed prior to and separate from molding the article may help produce an improved article, such as in one example by resulting in an article free or substantially free of air bubbles formed between the films 100.

The laminate 110 may be produced by the method 200 described above. The laminate 110 may cut to a predetermined shape and size to form a piece or sheet of laminate 110. The luggage shell 120 may be formed by molding the laminate 110 in a molding apparatus 240, such as a press form machine or plug mold machine. The laminate may be molded by an apparatus and/or by using a process similar, in a non-limiting example, to those described in EP Patent No. 1763430, PCT/EP2014/055514, or DE10259883 (also US2004/0118504). Regarding the process described in EP Patent No. 1763430, it should be noted that the gripping of the laminate is less particular in the molding process of the laminate 110 since the temperature at which the laminate 110 is molded may be lower, which is an advantage, and which lessens or avoids problems caused by material shrinkage that may occur at higher molding temperatures. Also compared to the process described in EP Patent No. 1763430, which discloses deep drawing self-reinforced thermoplastic composite lamina at about 170° C., the temperature range over which the laminate 110 is molded may be larger, which is an advantage because it allows for greater flexibility in molding conditions.

Figure 8:
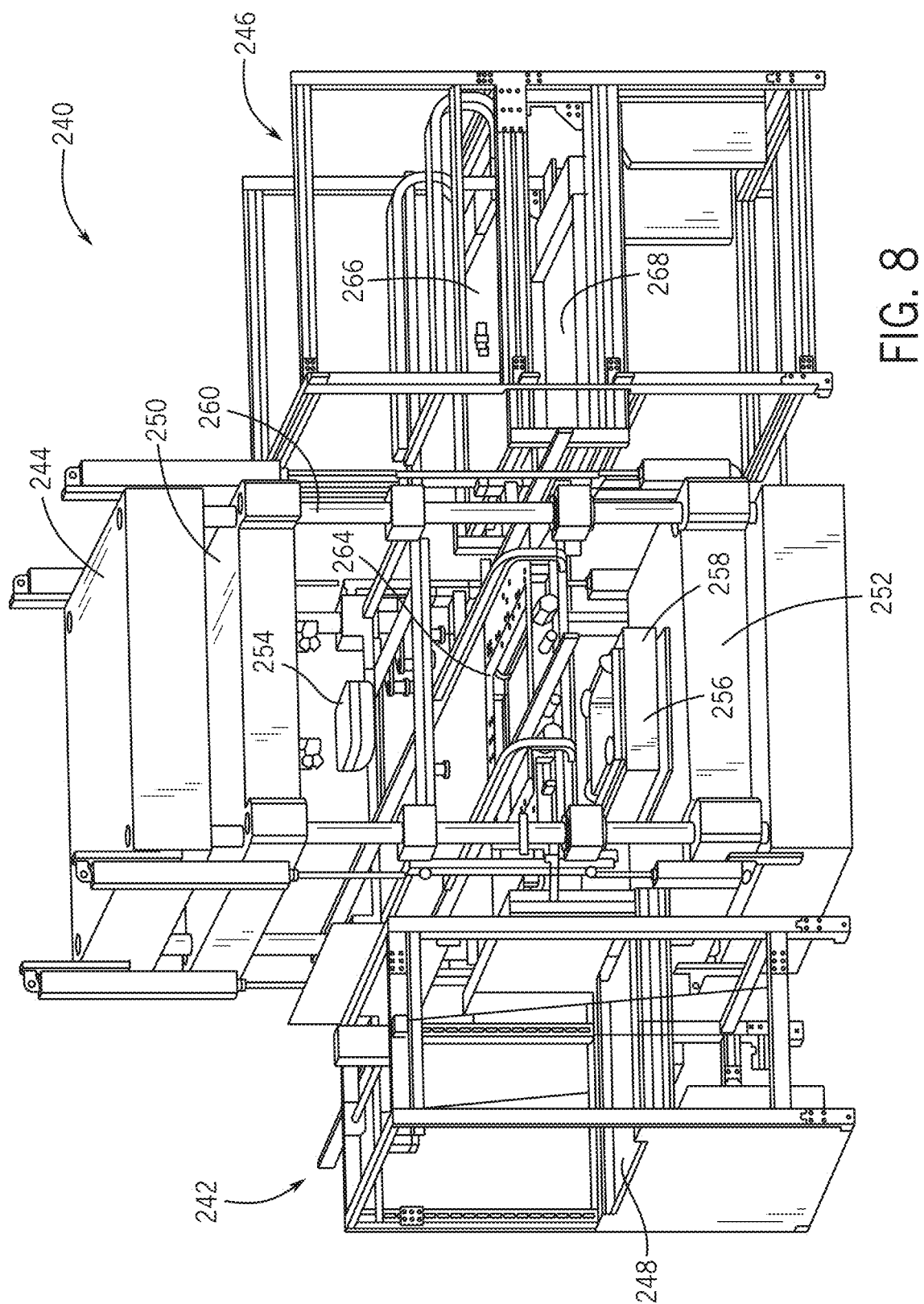
FIG. 8 is a molding apparatus according to one example.

Referring to FIG. 8, a molding apparatus 240 may include a lining dispenser 242, a press 244, and a heater array 246. In some embodiments, the lining dispenser 242 receives and distributes textile sheets, such as mesh, knit, woven, or non-woven fabric cloths, for molding with a sheet of laminate 110. A "mesh" may be a textile sheet having openings formed therethrough, such as a warp knitted open sheet. The textile sheet may serve as a lining of an interior of a luggage shell 120 produced in the molding apparatus 240. The textile sheet may introduce a texture, color, print, pattern, or design to the laminate 110. The textile sheets may be received and stored in a tray 248 before being distributed to sheets of laminate 110. Alternatively, the textile sheets may be distributed to the laminate 110 before the laminate 110 enters the molding apparatus 240. For example, the use of a mesh as the textile sheet may impart a textured nature to the surface of the laminate 110.

The press 244 includes an upper table 250 and a lower table 252. The upper table 250 may support an upper mold, which may be a male mold 254, of a deep drawing tool 256. In FIG. 8, a portion of the upper table 250 is removed to more clearly show the male mold 254. The lower table 252 may support a lower mold, which may be a female mold 258, of the deep drawing tool 256. The tables 250, 252 are movable relative to each other. For example, the upper table 250 may descend towards the female mold 258 along and guided by column frame 260. The lower table 252 may move upwards toward the male mold 254. The molds 254, 258 are complimentary to each other such that one mold, for example the male mold 254, fits at least partially inside the other mold, for example the female mold 258.

The press 244 further includes a sheet gripping rack 264. The rack 264 is configured to controllably hold each laminate 110 sheet in a position between the male mold 254 and the female mold 258. The rack 264 may also be configured to stretch or apply tension to the laminate 110 sheets.

The heater array 246 includes an upper heater 266 and a lower heater 268. The heaters 266, 268 may be configured to slide simultaneously from the heater array 246 to a position between the male and female molds 254, 258.

Figure 9:
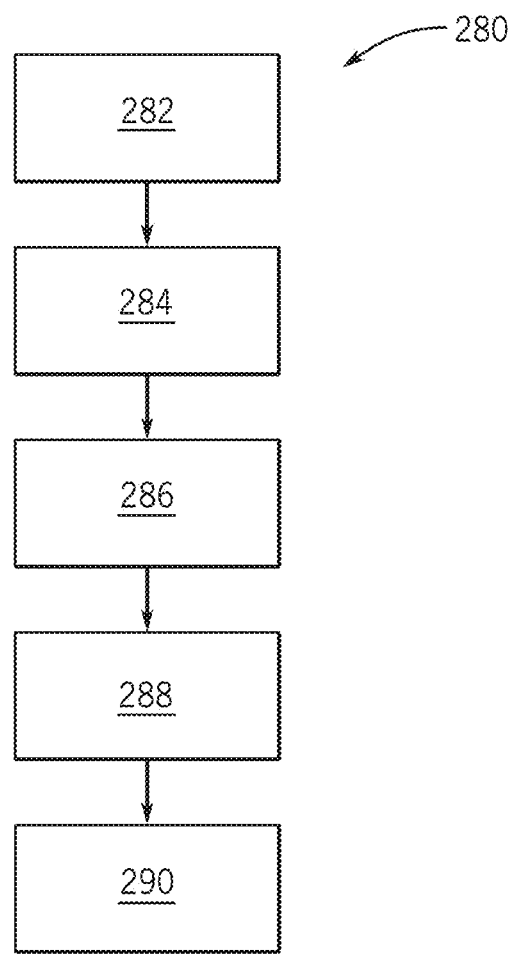
FIG. 9 is a block diagram of the steps of a method of making an article from the laminate of FIGS. 2A and 2B according to one example.

Referring to FIG. 9, a method 280 of making a luggage shell 120 may include a step 282 of pre-heating a laminate 110, a step 284 of introducing the laminate 110 into a molding apparatus 240, a step 286 of clamping and heating the laminate 110, a step 288 of molding the laminate 110 into an article, and a step 290 of releasing the article from the molding apparatus 240.

In step 282, the laminate 110 is heated to a desired temperature. The temperature is high enough to melt or partially melt the outer layer 104 and melt or partially melt the core 102. The temperature may be about 120° C. to about 190° C., about 125° C. to about 190° C., about 130° C. to about 190° C., about 135° C. to about 190° C., about 140° C. to about 190° C., about 145° C. to about 190° C., about 150° C. to about 190° C., about 120° C. to about 185° C., about 120° C. to about 180° C., about 120° C. to about 175° C., about 120° C. to about 170° C., about 120° C. to about 165° C., or about 120° C. to about 160° C. In one example, the temperature is about 145° C. to about 170° C. In yet another example, the temperature is about 140° C. to about 165° C.

Instead of or in addition to melting the outer layer 104 and core 102, the outer layer 104 and core 102, or films 100 within or between the outer layer 104 and core 102, may be cross-linked with each other, or otherwise bonded with each other, such as by chemical, physical, or adhesive bonding. Melting, cross-linking, and/or otherwise bonding films 100 may help produce a luggage shell 120 with improved physical properties, such as durability, resistance to deformation, and impact resistance.

Referring again to FIG. 9, in step 284, the sheet of laminate 110 is introduced to a molding apparatus 240. The sheet of laminate 110 may be introduced to the press 244 from a sheet supply behind (as viewed in FIG. 8) the press 244. With reference to FIG. 8, the laminate 110 is held between the male mold 254 and the female mold 258 by the sheet gripping rack 264.

In step 286, the laminate 110 is clamped and heated. The laminate 110, such as the edges of a sheet, may be clamped by the sheet gripping rack 264. The rack 264 may or may not stretch or apply tension to the laminate 110. In the construction of the article, the application of a tension or pressure may help further consolidate the films 100 of the laminate 110 together. The tension or pressure applied to the laminate 110 may be less than about 5 bar, such as about 0.5 to about 4 bar, about 0.5 to about 3 bar, about 0.5 to about 3.5 bar, about 0.5 to about 3 bar, about 0.5 to about 2.5 bar, about 0.5 to about 2 bar, or about 1.5 to about 2 bar.

With reference to FIG. 8, heaters 266, 268 may heat the laminate 110 sheet while it is being held between the male and female molds 254, 258. The top and/or bottom sides of the laminate may be heated. The laminate may be gripped or gripped and stretched by the sheet gripping rack 264. The laminate 110 may be heated to a temperature high enough to melt or partially melt the outer layer 104 and melt or partially melt the core 102. The laminate 110 may be heated to a temperature of about 120° C. to about 190° C., about 125° C. to about 190° C., about 130° C. to about 190° C., about 135° C. to about 190° C., about 140° C. to about 190° C., about 145° C. to about 190° C., about 150° C. to about 190° C., about 120° C. to about 185° C., about 120° C. to about 180° C., about 120° C. to about 175° C., about 120° C. to about 170° C., about 120° C. to about 165° C., or about 120° C. to about 160° C. In one example, the laminate is heated to a temperature of about 145° C. to about 170° C. In another example, the temperature is about 140° C. to about 165° C.

In some implementations, step 286 includes introduction of a textile sheet to a top or bottom side of the laminate 110. For example, the textile sheet may be placed between the upper heater 266 and the male mold 254.

Referring again to FIG. 9, in step 288, the sheet of laminate 110 is molded into an article, such as a luggage shell 120. The laminate 110 sheet may be heated while being molded. The laminate 110 may be heated to a temperature high enough to melt or partially melt the outer layer 104 and melt or partially melt the core 102. The laminate 110 may be heated to a temperature of about 120° C. to about 190° C., about 125° C. to about 190° C., about 130° C. to about 190° C., about 135° C. to about 190° C., about 140° C. to about 190° C., about 145° C. to about 190° C., about 150° C. to about 190° C., about 120° C. to about 185° C., about 120° C. to about 180° C., about 120° C. to about 175° C., about 120° C. to about 170° C., about 120° C. to about 165° C., or about 120° C. to about 160° C. In one example, the laminate 110 is heated to a temperature of about 140° C. to about 180° C. In another example, the laminate 110 is heated to a temperature of about 145° C. to about 170° C. In another example, the temperature is about 140° C. to about 165° C.

The laminate 110 may be heated for about 10 seconds to about 40 seconds, about 15 seconds to about 40 seconds, about 20 seconds to about 40 seconds, about 25 seconds to about 40 seconds, about 30 seconds to about 40 seconds, about 10 seconds to about 35 seconds, about 10 seconds to about 30 seconds, about 10 seconds to about 25 seconds, or about 10 seconds to about 20 seconds. In one embodiment, the laminate 110 is heated for about 15 seconds to about 35 seconds.

In one example of molding, the lower mold, such as the female mold 258, moves upward to contact the underside of the heated and stretched laminate 110 sheet. The upper mold, in this case the male mold 254, moves downward, which forces the laminate 110 sheet into contact with most or all the mold 254, 258 surfaces and thereby shapes the laminate 110 sheet. If present, the textile sheet is simultaneously adhered to the laminate 110 sheet.

The molds 254, 258 may come together, or close, quickly, which may help reduce the number of wrinkles produced in the corner portions 146 of a deep drawn article, such as a luggage shell 120. The molds 254, 258 may remain in the closed position for about 15-45 seconds, about 15-40 seconds, about 15-35 seconds, about 15-30 seconds, about 20-45 seconds, about 25-45 seconds, or about 30-45 seconds. In one example, the molds 254, 258 remain in the closed position for about 30 seconds.

In step 290, the luggage shell 120 is released from the molding apparatus 240. The laminate 110 may be heated and formed into a luggage shell 120 in about 60-120 seconds, about 60-110 seconds, about 60-100 seconds, about 60-90 seconds, about 70-120 seconds, about 80-120 seconds, or about 90-120 seconds. In one example, a laminate 110 is heated and formed into a luggage shell 120 in about 90 seconds.

A luggage shell 120 produced by the method 280 described above may be used in a luggage case 150 as shown in FIG. 7b.

It should be noted that all directional and/or dimensional references (e.g., upper, lower, upward, downward, left, right, leftward, rightward, top, bottom, above, below, front, back, rear, forward, backward, rearward, inner, outer, inward, outward, vertical, horizontal, clockwise, counterclockwise, length, width, height, depth, and relative orientation) are only used for identification purposes to aid the reader's understanding of the implementations of the disclosed invention(s), and do not create limitations, particularly as to the position, orientation, use relative size or geometry of the invention(s) unless specifically set forth in the claims.

Connection references (e.g., attached, coupled, connected, joined, and the like) are to be construed broadly and may include intermediate members between a connection of elements and relative movement between elements. As such, connection references do not necessarily infer that two elements are directly connected and in a fixed relation to each other.

In some instances, components are described with reference to "ends" having a particular characteristic and/or being connected with another part. However, those skilled in the art will recognize that the disclosed invention(s) is not limited to components that terminate immediately beyond their points of connection with other parts. Thus, the term "end" should be interpreted broadly, in a manner that includes areas adjacent, rearward, forward of, or otherwise near the terminus of a particular element, link, component, part, member or the like. In methodologies directly or indirectly set forth herein, various steps and operations are described in one possible order of operation, but those skilled in the art will recognize that steps and operations may be rearranged, replaced, or eliminated without necessarily departing from the spirit and scope of the present invention. It is intended that all matter contained in the above description or shown in the accompanying drawings shall be interpreted as illustrative only and not limiting. Changes in detail or structure may be made that are within the scope of the appended claims.

The invention claimed is:

1. A method of making a luggage shell, the method comprising:
   providing a plurality of films;
   laminating the plurality of films together to form a laminate; and
   moulding the laminate to form a luggage shell;
   wherein:
      the films have a core of a biaxially oriented thermoplastic polymer and an outer layer of a thermoplastic polymer on each of the top and bottom side of the core; and
      the films are laminated at a temperature of 120-190° C.; and
      the laminate has a stiffness of 3.5-5 GPa in the transverse direction and a stiffness of 1.5-3 GPa in the longitudinal direction.

2. A method as claimed in claim 1, wherein the respective core and the respective outer layer are coextruded to form each of the respective plurality of films.

3. A method as claimed in claim 1, wherein the respective outer layer has a thickness of 0.5% to 25% of the thickness of the respective film.

4. A method as claimed in claim 1, wherein at least two adjacent films are oriented in the same direction.

5. A method as claimed in claim 1, wherein all the films are oriented in the same direction.

6. A method as claimed in claim 1, wherein the cores comprise biaxially oriented polypropylene.

7. A method as claimed in claim 1, wherein the outer layers comprise: a copolymer of polypropylene and polyethylene; or a terpolymer of polypropylene, polyethylene and polybutene.

8. A method as claimed in claim 1, wherein the melting point of the cores is higher than a melting point of the outer layers, for example wherein the melting point of the cores is at least 10° C. higher than the melting point of the outer layers.

9. A method as claimed in claim 1, wherein the method further comprises stretching the films, and wherein the films are stretched to a greater extent in one of a transverse direction and a longitudinal direction than in the other of the transverse direction and the longitudinal direction.

10. A method as claimed in claim 1, wherein the films have a tensile strength of 60 to 190 MPa in the longitudinal direction and a tensile strength of 150 to 300 MPa in the transverse direction.

11. A method as claimed in claim 1, wherein the laminate includes 10 to 50 films.

12. A method as claimed in claim 1, wherein the laminate includes at least one film constructed of a thermoplastic polymer different than the thermoplastic polymer of the core.

13. A method as claimed in claim 1, wherein the films are laminated at a temperature of [110° C.] 120° C. to 130° C.

14. A method as claimed in claim 1, wherein the films are polypropylene films.

15. A method as claimed in claim 1, wherein the films are laminated at a temperature of 130° C. or less.

16. A method as claimed in claim 1, wherein the films are laminated at a pressure of 10 bar or less.

17. A method as claimed in claim 3, wherein said outer layer has a thickness of 2% to 7% of the thickness of said film.

18. A method as claimed in claim 11, wherein the laminate includes 22 or 23 films.

* * * * *